(12) United States Patent
Naito et al.

(10) Patent No.: US 9,196,428 B2
(45) Date of Patent: Nov. 24, 2015

(54) GANG SOCKET AND JIG FOR MANUFACTURING CAPACITOR ELEMENT THAT USES SAID GANG SOCKET

(75) Inventors: Kazumi Naito, Tokyo (JP); Masahiro Suzuki, Tokyo (JP)

(73) Assignee: Showa Denko K.K., Tokyo (JP)

( * ) Notice: Subject to any disclaimer, the term of this patent is extended or adjusted under 35 U.S.C. 154(b) by 183 days.

(21) Appl. No.: 13/993,371

(22) PCT Filed: Oct. 13, 2011

(86) PCT No.: PCT/JP2011/073507
§ 371 (c)(1),
(2), (4) Date: Aug. 7, 2013

(87) PCT Pub. No.: WO2012/081300
PCT Pub. Date: Jun. 21, 2012

(65) Prior Publication Data
US 2013/0305504 A1 Nov. 21, 2013

(30) Foreign Application Priority Data
Dec. 13, 2010 (JP) ................. 2010-277100

(51) Int. Cl.
*H01G 13/00* (2013.01)
*H01G 9/012* (2006.01)
(Continued)

(52) U.S. Cl.
CPC ............. *H01G 13/00* (2013.01); *H01G 9/0032* (2013.01); *H01G 9/0036* (2013.01); *H01G 9/012* (2013.01); *H01G 9/15* (2013.01); *H01G 9/0029* (2013.01); *H01G 13/006* (2013.01); *Y10T 29/417* (2015.01)

(58) Field of Classification Search
CPC ... H01G 13/00; H01G 9/0036; H01G 9/0032; H01G 9/15; H01G 9/012; H01G 9/0029; H01G 13/006; Y10T 29/417
See application file for complete search history.

(56) References Cited

U.S. PATENT DOCUMENTS 6,960,092 B1   11/2005   Hussain et al.
7,602,201 B2   10/2009   Ysaguirre et al.
(Continued)

FOREIGN PATENT DOCUMENTS

CN   201029107 Y   2/2008
JP   57-37820 A    3/1982
(Continued)

OTHER PUBLICATIONS

Official Communication issued in International Patent Application No. PCT/JP2011/073507, mailed on Jan. 17, 2012.
(Continued)

*Primary Examiner* — Laura Menz
(74) *Attorney, Agent, or Firm* — Keating & Bennett, LLP

(57) ABSTRACT

Provided is a gang socket with which capacitor elements can be manufactured without contaminating chemical conversion treatment liquids or semiconductor layer forming liquids even when the chemical conversion treatment liquids and semiconductor layer forming liquids are corrosive and with which heat treatment can be carried out without obstacles even when heat treatment is carried out during the manufacture of the capacitor elements. This gang socket (1) is provided with a plurality of conductive socket main units (2) provided with insertion openings (37) and an insulator part (5) forming a plurality of receiving parts (6) that can accommodate at least part of the socket main units (2) and provided with a plurality of small openings (7) connecting to the bottom surface of the receiving parts (6) on a bottom surface (5b). The insulator part (5) is constituted of a material having heat resistance and corrosion resistance. At least part of the socket main units (2) are accommodated and secured in the receiving parts (6) of the insulator part (5), and the insertion openings (37) and the small openings (7) are connected.

12 Claims, 11 Drawing Sheets

(51) Int. Cl.
  *H01G 9/15*   (2006.01)
  *H01G 9/00*   (2006.01)

(56) References Cited

U.S. PATENT DOCUMENTS 7,938,937 B2 * 5/2011 Naito .......................... 204/198
2009/0052118 A1   2/2009 Naito

FOREIGN PATENT DOCUMENTS

| JP | 10-32153 A | 2/1998 |
|---|---|---|
| JP | 2007-48960 A | 2/2007 |
| JP | 2010-530973 A | 9/2010 |
| JP | 2011-238740 A | 11/2011 |
| KR | 10-2006-0059981 A | 6/2006 |
| WO | 2006/101167 A1 | 9/2006 |
| WO | 2010/107011 A1 | 9/2010 |

OTHER PUBLICATIONS

Official Communication issued in corresponding Chinese Patent Application No. 201180059821.7, mailed on Jul. 3, 2015.

* cited by examiner

GANG SOCKET AND JIG FOR MANUFACTURING CAPACITOR ELEMENT THAT USES SAID GANG SOCKET

TECHNICAL FIELD

The present invention relates to a gang socket suitably used in a capacitor element manufacturing jig for manufacturing capacitor elements for use in a solid electrolytic capacitor and the like, for example.

BACKGROUND ART

A capacitor around the periphery of the CPU (Central Processing Unit) for use in personal computers and the like has been demanded to have high capacity and low ESR (equivalent series resistance) in order to suppress voltage variation and to keep the heat generation during the passage of a high ripple at a low level. As such a capacitor, an aluminum solid electrolytic capacitor, a tantalum solid electrolytic capacitor, and the like have been used. As these solid electrolytic capacitors, a capacitor is known which is constituted of one electrode (anode body) containing a sintered body obtained by sintering an aluminum foil having fine pores in a surface layer or tantalum powder having fine pores therein, a dielectric layer formed on the surface of the electrode, and another electrode (usually a semiconductor layer) formed on the dielectric layer.

As the solid electrolytic capacitor, a method is known which includes electrically connecting one end of a lead wire extended from the anode body to a metallic connection terminal of a socket attached to a lower end portion of a circuit board on which electrical circuits are formed and immersing the anode body in a chemical conversion treatment liquid, applying a voltage, while using the anode body side as an anode, between the anode and a cathode disposed in the chemical conversion treatment liquid to apply a constant current to thereby form a dielectric layer on the surface of the anode body, immersing the anode body on the surface of which the dielectric layer is formed in a semiconductor layer forming liquid, applying a voltage, while using the anode body side as an anode, between the anode and a cathode disposed in the semiconductor layer forming liquid to apply a constant current to thereby further form a semiconductor layer on the surface of the dielectric layer on the surface of the anode body (Patent Document 1).

PRIOR ART DOCUMENTS

Patent Documents

Patent Document 1: International Publication No. 2010/107011, pamphlet

SUMMARY OF INVENTION

Technical Problem

However, when using a treatment liquid containing acid, such as phosphoric acid, as the chemical conversion treatment liquid, there has been a problem in that, due to the fact that the metallic connection terminal is exposed to the bottom surface side of the socket to mist or the like of the chemical conversion treatment liquid containing acid, such as phosphoric acid, the exposed portion is partially corroded and falls to be mixed in the chemical conversion treatment liquid, which contaminates the chemical conversion treatment liquid. When the chemical conversion treatment liquid is contaminated as described above, it becomes difficult to form a good dielectric layer, so that a capacitor having sufficient moisture resistance cannot be manufactured.

When using a solution containing acid as the semiconductor layer forming liquid, there has been a problem similarly as above in that, due to the fact that the metallic connection terminal is exposed to the bottom surface side of the socket to mist or the like of the semiconductor layer forming liquid containing acid, the exposed portion is partially corroded and falls to be mixed in the semiconductor layer forming liquid, which contaminates the solution. When the semiconductor layer forming liquid is contaminated as described above, it becomes difficult to form a good semiconductor layer.

A capacitor manufactured from a capacitor element sometimes requires heat treatment at a high temperature in a manufacturing process of the capacitor element depending on the intended use. For example, a case where, after the formation of the dielectric layer, the dielectric layer is allowed to stand at a high temperature of several hundred degrees (for example, about 400° C.) to repair minute cracks in the dielectric layer, a case where, after the formation of the semiconductor layer or a conductor layer, the dielectric layer which deteriorates due to a stress caused by a reaction or drying and curing is repaired by combining heat treatment (for example, 200° C. or higher) and re-chemical conversion treatment, and the like are mentioned. However, there has been a problem in that, when the heat treatment is performed in the manufacturing process of the capacitor element, a socket, whose insulator part is formed with resin as in a former socket, does not stand (melts) the heat treatment at such a high temperature.

The present invention has been made in view of such technical circumstances. It is an object of the invention to provide a gang socket with which capacitor elements can be manufactured without contaminating chemical conversion liquids or semiconductor layer forming liquids even when, the chemical conversion liquids contain acid, the semiconductor forming liquids contain acid, or the like, i.e., the chemical conversion liquids or the semiconductor layer forming liquids have corrosive, and with which heat treatment can be carried out without obstacles when the heat treatment is required to perform during the manufacture of the capacitor elements and a capacitor element manufacturing jig.

Solution to Problem

In order to achieve the object, the invention provides the following measures.

[1] A gang socket contains:
   a plurality of conductive socket main units provided with insertion openings; and
   a plurality of receiving units that can accommodate at least part of the socket main units including the insertion openings, in which
   an insulator part is provided in which the plurality of socket main units are accommodated with the insertion openings toward a bottom surface of each of the receiving units and small holes, each of which is connected to a lower surface of the gang socket from each bottom surface of each of the receiving units, are formed,
   at least a lower surface of the insulator part is constituted of a material having corrosion resistance, and
   at least part of the socket main units are accommodated and secured into the receiving units of the insulator part and the insertion openings and the small holes are connected.

[2] The gang socket according to 1 above, in which the insulator part is constituted of a material further having heat resistance.

[3] The gang socket according to 1 or 2 above, in which, as a material constituting the insulator part, at least one material selected from the group consisting of synthetic resin, ceramics, glass, and stainless steel is used.

[4] The gang socket according to any one of 1 to 3 above, in which a transparent material is used as the material constituting the insulator part.

[5] The gang socket according to any one of 1 to 4 above, in which, as the shape of the small holes as viewed in plan from the lower side, the small holes are larger than a 0.1 mm diameter circle and are equal to or smaller than a 0.55 mm square.

[6] The gang socket according to any one of 1 to 5 above, in which the small hole is a hole into which a lead wire of an anode body for capacitor having the lead wire is inserted and, as the shape of the small holes as viewed in plan from the lower side, the small holes are larger than the transverse cross sectional shape of the lead wire to be inserted and are equal to or smaller than a similar figure in which the transverse cross sectional shape is enlarged by 1.1 times.

[7] The gang socket according to any one of 1 to 6 above, in which the depth of the small holes is 0.2 mm to 8 mm.

[8] The gang socket according to any one of 1 to 7 above, in which, by enclosing a filler in at least part of a gap between the accommodated socket main units and the insulator part, the socket main units are secured into the receiving unit of the insulator part.

[9] The gang socket according to any one of 1 to 8 above, in which the entire socket main units are accommodated in the receiving unit of the insulator part and the upper surface of the filler is located at a position lower than the upper surface of the insulator part.

[10] The gang socket according to any one of 1 to 9 above, in which the socket main units each have a pillar portion and an inclined surface portion downwardly extended from a peripheral portion of the lower end of the pillar portion in such a manner as to outwardly extend.

[11] The gang socket according to any one of 1 to 10 above, in which the socket main units each have an electrically connected conductive lead wire portion.

[12] A capacitor element manufacturing jig contains:
a circuit board on which an electrical circuit is formed; and
the gang socket according to any one of 1 to 11 above detachably attached to the circuit board, in which
the socket main units are electrically connected to the electrical circuit, and
the electrical circuit limits a current for each socket main unit.

[13] The capacitor element manufacturing jig according to 12 above, in which the electrical circuit is a constant current circuit.

[14] The capacitor element manufacturing jig according to 12 or 13 above, in which the electrical circuit is also a circuit which limits a voltage for each socket main unit.

[15] A method for manufacturing a capacitor element includes:
a dielectric layer formation process of connecting an anode body for capacitor to a gang socket of the capacitor element manufacturing jig according to any one of 12 to 14 above and immersing the anode body in a chemical conversion treatment liquid, and then applying a current while using the anode body as an anode in the immersed state to form a dielectric layer on the surface of the anode body; and after the dielectric layer formation process, a heat treatment process of removing the gang socket to which the anode bodies are connected from a circuit board of the jig, and then heat treating the anode body connected to the gang socket.

[16] A method for manufacturing a capacitor element includes:
a semiconductor layer formation process of connecting an anode body on the surface of which a dielectric layer is formed to a gang socket of the capacitor element manufacturing jig according to any one of 12 to 14 above and immersing the anode body in a semiconductor layer forming liquid, and then applying a current while using the anode body as an anode in the immersed state to form a semiconductor layer on the surface of the dielectric layer on the surface of the anode body; and after the semiconductor layer formation process, a heat treatment process of removing the gang socket to which the anode bodies are connected from a circuit board of the jig, and then heat treating the anode body connected to the gang socket.

[17] A method for manufacturing a capacitor element includes:
a dielectric layer formation process of connecting an anode body to the gang socket of the capacitor element manufacturing jig according to any one of 12 to 14 above and immersing the anode body in a chemical conversion treatment liquid, and applying a current while using the anode body as an anode in the immersed state to form a dielectric layer on the surface of the anode body; and a semiconductor layer formation process of immersing the anode body on the surface of which the dielectric layer is formed obtained through the dielectric layer formation process in a semiconductor layer forming liquid, and applying a current while using the anode body as an anode in the immersed state to form a semiconductor layer on the surface of the dielectric layer on the surface of the anode body, the method further including:

between the dielectric layer formation process and the semiconductor layer formation process and/or after the semiconductor layer formation process, a heat treatment process of removing the gang socket to which the anode bodies are connected from the circuit board of the jig, and then heat treating the anode body connected to the gang socket.

[18] The method for manufacturing a capacitor element according to any one of 15 to 17 above, in which the heat treatment is performed at 200° C. to 500° C.

[19] A method for manufacturing a capacitor includes electrically connecting an electrode terminal to each of the anode body and the semiconductor layer of the capacitor element obtained by the manufacturing method according to any one of 15 to 18 above, and sealing while leaving a part of the electrode terminals.

Advantageous Effects of Invention

In the gang socket according to the invention of [1], at least part of the socket main units is accommodated and secured into the receiving unit of the insulator part constituted of a material having corrosion resistance and small holes connecting to insertion openings of the socket main units are formed in the lower surface of the insulator part, and when the lead wire of the anode body is inserted into the insertion opening through the small hole, the small hole in the lower surface of the insulator part is blocked by the lead wire. Thus, even when the chemical conversion treatment liquid contains acid and the semiconductor layer forming liquid contain acid, the insertion openings and the like of the socket main units are hard to be exposed to mist (mist containing acid) and the like of the chemical conversion treatment liquid or the semiconductor layer forming liquid, so that the corrosion of the insertion openings and the like of the socket main units can be prevented and also, even when the socket main units are corroded, the corroded substance can be prevented from falling. Thus, a capacitor element can be manufactured without contaminating the chemical conversion treatment liquid and the semiconductor layer forming liquid.

According to the invention of [2], since the insulator part is constituted of a material further having heat resistance, heat treatment can be performed without obstacles even when the heat treatment is required to perform during the manufacture of the capacitor element.

According to the invention of [3], since the insulator part is constituted using at least one material selected from the group consisting of synthetic resin, ceramics, glass, and stainless steel, the corrosion resistance of the insulator part can be further increased. In particular, when the insulator part is constituted using at least one material selected from the group consisting of synthetic resin, ceramics, glass, and stainless steel, the heat resistance of the insulator part can be further increased. Even when heat treatment is required to perform during the manufacture of the capacitor element, heat treatment can be performed without obstacles.

According to the invention of [4], since a transparent material is used as the material constituting the insulator part, the occurrence of the corrosion of the socket main units and the corrosion level can be easily confirmed.

According to the invention of [5], [6], and [7], since the small holes in the lower surface of the insulator part are further blocked by the lead wire, the insertion openings and the like of the socket main units are further hard to be exposed to mist (mist containing acid) and the like of the chemical conversion treatment liquid or the semiconductor layer forming liquid, so that the corrosion of the insertion openings and the like of the socket main units can be prevented. Even when the socket main units are corroded, the corroded substance can be further prevented from falling.

According to the invention of [8], since the socket main units are secured into the receiving unit of the insulator part by enclosing a filler in at least part of the gap between the accommodated socket main units and the insulator part, the gang socket in which the plurality of socket main units are sufficiently secured to the insulator part is provided.

According to the invention of [9], the entire socket main units are accommodated in the receiving unit of the insulator part and the upper surface of the filler is located at a position lower than the upper surface of the insulator part. Thus, when the gang socket of the invention is attached to a first row gang socket attached to the circuit board, for example, the vertical position (the attachment height of the gang socket of the invention) of the attachment position of the gang socket can be accurately determined by attaching the gang socket of the invention in such a manner that the upper surface of the insulator part abuts on the lower surface of the gang socket of the first row.

According to the invention of [10], the socket main units each have the pillar portion and the inclined surface portion downwardly extended from a peripheral portion of the lower end of the pillar portion in such a manner as to outwardly extend. Thus, by accommodating the socket main units in the receiving unit of the insulator part in such a manner that the outer edge of the inclined surface portion is almost in agreement with the periphery of the bottom surface of the receiving unit, the secured position in the horizontal plane in the receiving unit of the socket main units can be determined and also a gap (gap for enclosing a bonding material, such as glass) can be secured between the socket main units and the insulator part.

According to the invention of [11], the socket main units each have the electrically connected conductive lead wire portion, and can be connected to an electrical circuit described later through the socket or the like by providing the lead wire portion as described above. Thus, the connection with the electrical circuit and an exchange with another electrical circuit are facilitated.

According to the invention of [12], [13], and [14], even when the chemical conversion treatment liquid contains acid and the semiconductor layer forming liquid contains acid, the capacitor element manufacturing jig with which capacitor elements can be manufactured without contaminating the chemical conversion treatment liquid and the semiconductor layer forming liquid is provided. Thus, when the capacitor element manufacturing jig according to the invention is used, capacitor elements having sufficient moisture resistance performance can be manufactured. Moreover, the gang socket in which the insulator part is constituted of a material having heat resistance is detachably attached to the circuit board. Thus, when heat treatment is required to perform during the manufacture of the capacitor elements, the gang socket to which the anode bodies are connected is removed from the circuit board of the jig, and the gang socket to which the anode bodies are connected can be heat treated (application of the heat treatment to the circuit board and the like can be avoided), so that heat treatment can be smoothly performed without obstacles. When further treatment is required after the heat treatment, the gang socket (in a state where the anode bodies are connected) of the invention may be attached again to a gang socket connection portion after the heat treatment.

According to the invention of [15], [16], [17], and [18], since the chemical conversion treatment liquid and the semiconductor layer forming liquid are not contaminated when manufacturing the capacitor elements, high quality capacitor elements having sufficient moisture resistance performance can be manufactured. Moreover, the gang socket in which the insulator part is constituted of a material having heat resistance is detachably attached to the circuit board. Thus, when heat treatment is performed, the gang socket to which the anode bodies are connected is removed from the circuit board of the jig, and the anode body connected to the gang socket can be heat treated (application of the heat treatment to the circuit board and the like can be avoided), so that the heat treatment can be smoothly performed without obstacles.

According to the invention of [19], a high quality capacitor having sufficient moisture resistance performance can be manufactured.

BRIEF DESCRIPTION OF DRAWINGS

FIG. 1 are views illustrating one embodiment of a capacitor element manufacturing jig according to the invention, in which FIG. 1(A) is a front view and FIG. 1(B) is a rear view.

FIG. 3 are views in which one embodiment of a gang socket of the invention is enlarged, in which FIG. 3(A) is a front view, FIG. 3(B) is a bottom plan view, and FIG. 3(C) is a cross sectional view along the Y-Y line of FIG. 3(A).

DESCRIPTION OF EMBODIMENTS

Figure 3:
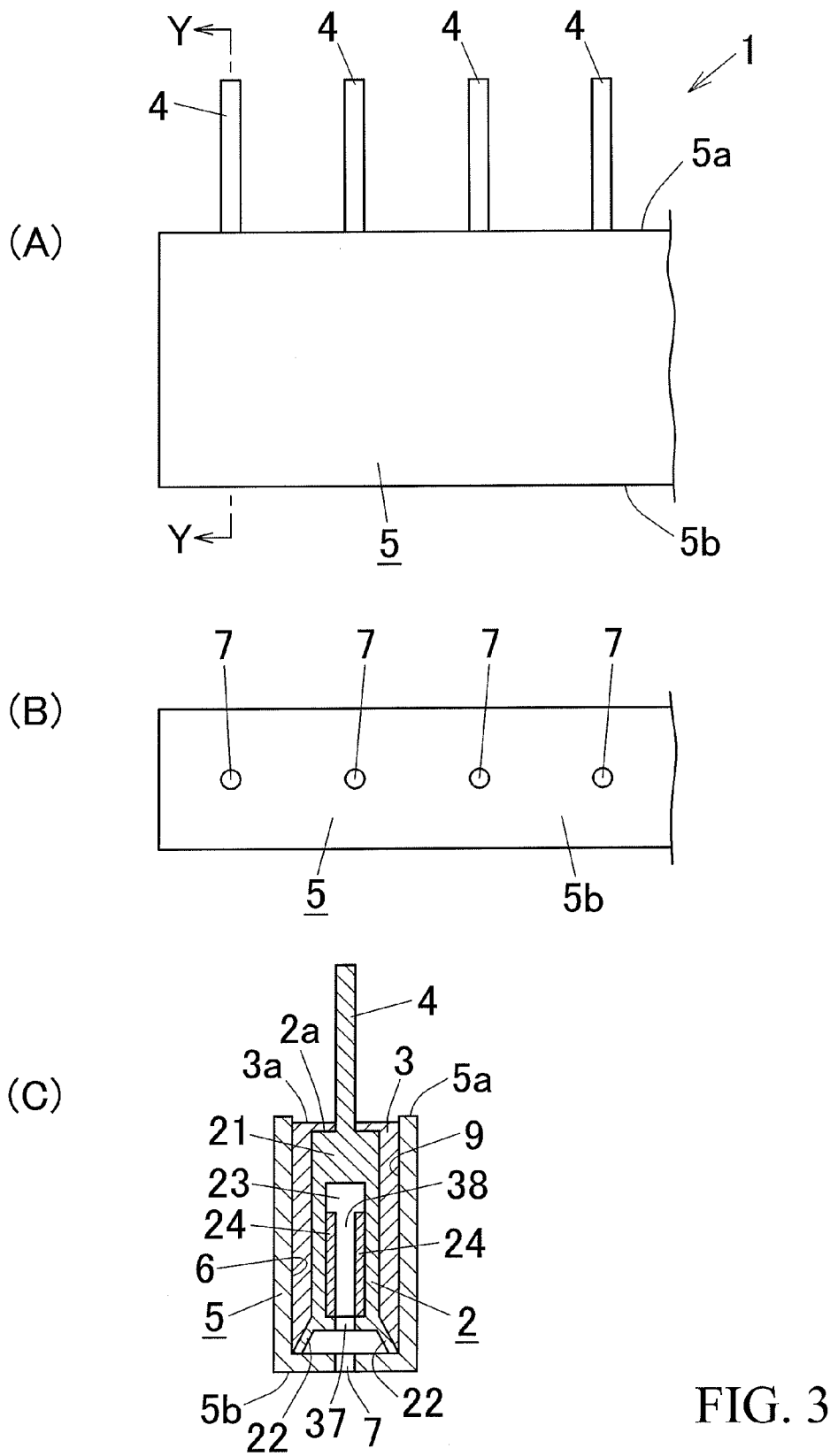
Figure 4:
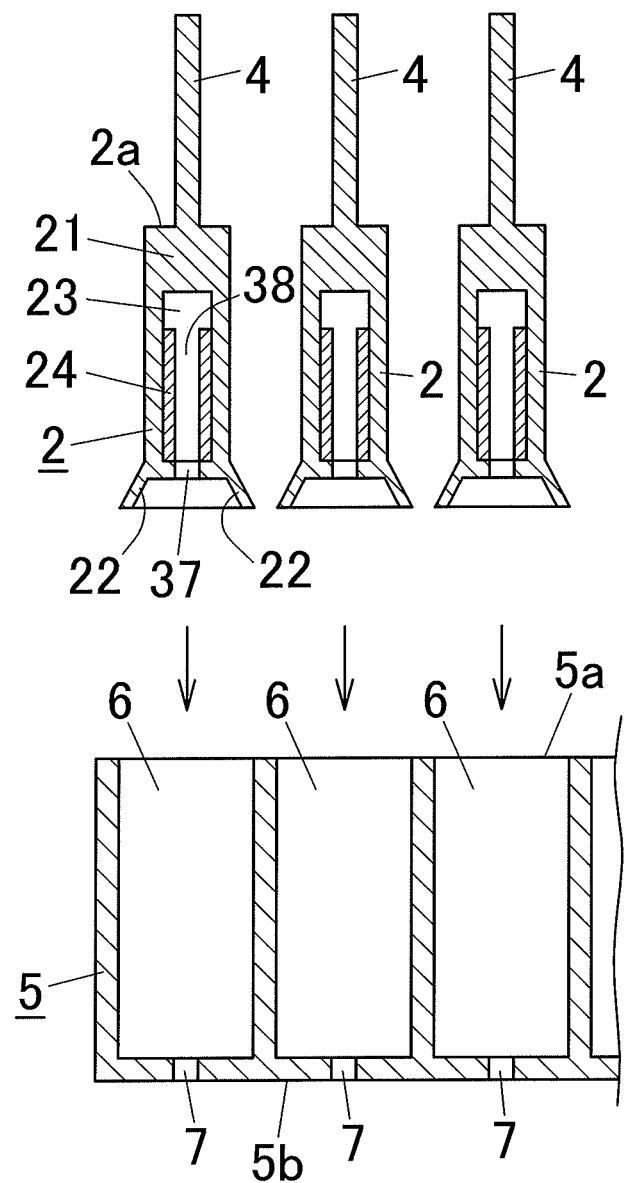
FIG. 4 is a cross sectional view in which a socket main units and an insulator part are separated.
Figure 5:
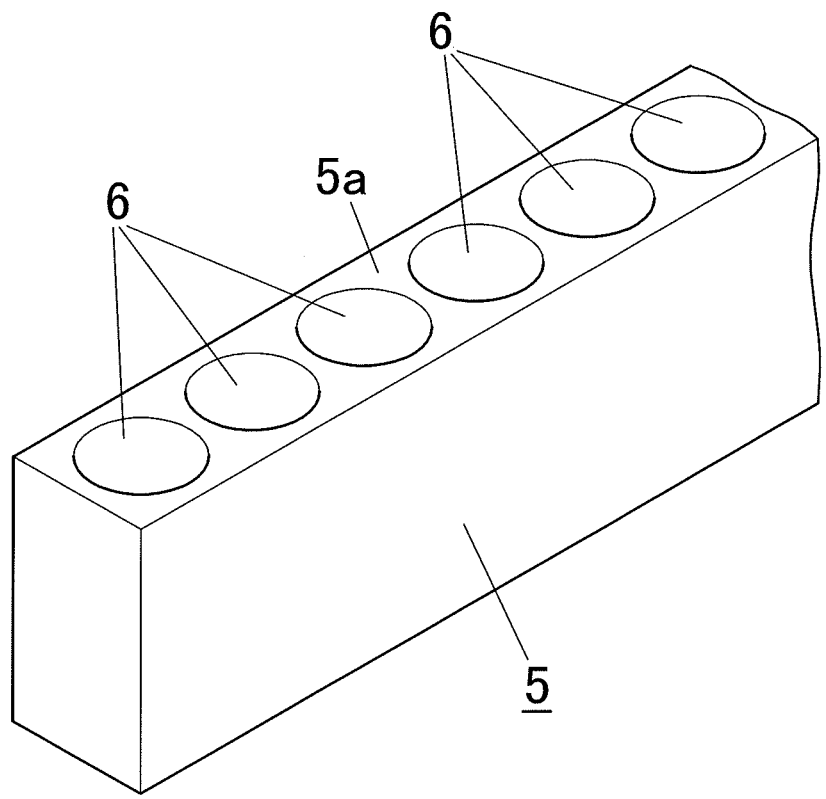
FIG. 5 is a perspective view illustrating an insulator part.

One embodiment of a gang socket 1 according to the invention is illustrated in FIG. 3. The gang socket 1 has a plurality of conductive socket main units 2 and an insulator part 5 (FIGS. 3 to 5). Preferably, in order to facilitate attachment to and detachment from a connection portion 88 described later, one lead wire portion 4 is extended from an upper surface 2a of each of the socket main units 2. In this embodiment, the plurality of socket main units 2 are connected in one row through the insulator part 5, whereby a parallel gang socket 1 is constituted (FIGS. 3 to 5).

The socket main unit 2 is a member having a function as an electrical connection terminal for achieving electrical connection with an anode body 52 and the like and is constituted of conductive materials, such as metal materials, in order to achieve electrical continuity. Metals constituting the socket main units 2 are not particularly limited and preferably contains metal (including alloy) containing at least one metal selected from the group consisting of copper, iron, silver, and aluminum as the main component (containing in a proportion of 50% by mass or more). On the surface of the socket main units 2, at least one layer of known plating, such as tin plating, solder plating, nickel plating, gold plating, silver plating, and copper plating, may be provided.

In this embodiment, the socket main units 2 each have a pillar portion 21 and an inclined surface portion 22 downwardly extended from a peripheral portion of the bottom surface of the pillar portion 21 in such a manner as to outwardly extend (FIGS. 3 and 4) and the pillar portion 21 and the inclined surface portion 22 are constituted of conductive materials, such as metal materials. A lead wire insertion opening 37 is formed at the central portion of the bottom surface of the pillar portion 21 (FIGS. 3 and 4). Hollow portions 23 are provided in each of the pillar portions 21. The hollow portions 23 are connected to the lead wire insertion openings 37. A metal spring member 24 is continuously connected to the inner circumferential surface of the hollow portions 23. A lead wire insertion hole 38 is formed while being surrounded by the metal spring member 24. The lead wire insertion holes 38 are connected to the space of the lead wire insertion openings 37. The socket main unit 2 and the anode body 52 are electrically connected by inserting and disposing a lead wire 53 and the like of the anode body 52 in the lead wire insertion hole 38 in a contact state.

The socket main units 2 are connected to an electrical circuit 30 described later through a connection portion 88 described later. The connection is not particularly limited insofar as the connection is electrically connectable and the following connection manner is mentioned, for example.

The lead wire portion 4 is extended from the central portion of an upper surface 2a (upper surface of the pillar portion 21) of the socket main units 2 (FIGS. 3 and 4). The lead wire portion 4 is constituted of conductive materials, such as metal materials. More specifically, the lead wire portion 4 is integrally formed with the socket main unit 2 and is electrically connected to the socket main unit 2. As metals constituting the lead wire portion 4, the same metals as those mentioned as metals constituting the socket main units 2 are mentioned. The lead wire portion 4 is usually constituted of the same metal as the metal constituting the socket main units 2.

Figure 7:
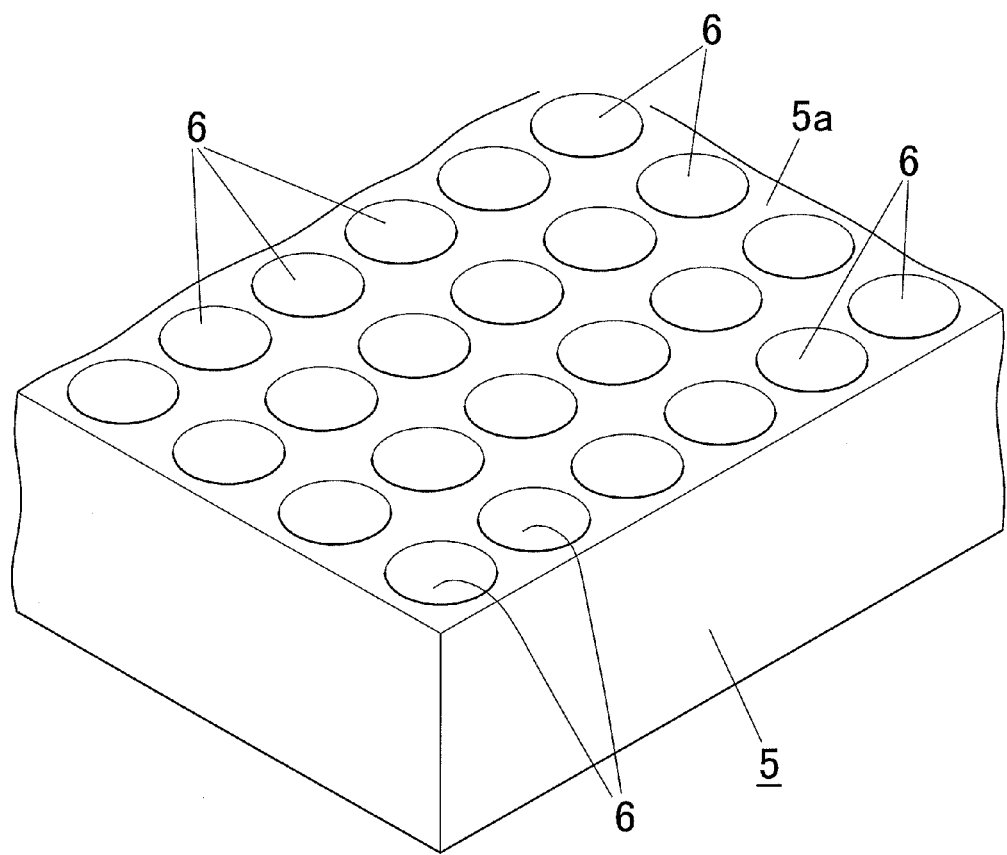
FIG. 7 is a perspective view illustrating another example of the insulator part.

At least a lower surface 5b, preferably the lower surface 5b and the side surface, of the insulator part 5 is constituted of materials having corrosion resistance. Furthermore, the insulator part 5 is preferably constituted of materials also having heat resistance. In the insulator part 5, a plurality of receiving units 6 each having a shape capable of accommodating at least part of the socket main units 2 (for example, a shape having a pillar-shaped concave portion) are provided in one row on an upper surface 5a and the like and a plurality of small holes 7 are formed in a lower surface 5b (FIGS. 3 to 5). More specifically, one small hole 7 connecting to the bottom surface is formed immediately under the bottom surface of each of the receiving units 6 in the lower surface 5b of the insulator part 5 (FIGS. 3 and 4). In the embodiment described above, the plurality of receiving units 6 are disposed in one row in the insulator part 5 (FIG. 5) but the invention is not particularly limited to such an aspect. For example, as illustrated in FIG. 7, a configuration in which a large number of receiving units 6 are provided in a plurality of rows (configuration in which a plurality of lines are disposed in the transverse direction and a plurality of rows are disposed in the longitudinal direction) may be adopted.

The materials constituting the insulator part 5 are preferably materials having corrosion resistance and more preferably materials having heat resistance and corrosion resistance. As a specific example of the materials having corrosion resistance, a material, such as synthetic resin, ceramics, glass, or stainless steel, is suitably used, for example. The materials constituting the insulator part 5 are more preferably materials having heat resistance and corrosion resistance and materials, such as ceramics, glass, and stainless steel, are mentioned. When using stainless steel, it is necessary to constitute the same in such a manner as to achieve insulation with the metal spring member 24.

The synthetic resin material is not particularly limited and, for example, hard resin, such as epoxy resin, phenol resin, imide resin, carbonate resin, amide resin, amide imide resin, ester resin, and phenylene sulfide resin, and the like are mentioned.

The ceramic material is not particularly limited and, for example, alumina, zirconia, titania, and the like are mentioned.

The glass material is not particularly limited and, for example, borosilicate glass and the like are mentioned.

When a transparent material is used as the material constituting the insulator part 5, the occurrence of corrosion of the socket main units 2 and the corrosion level can be easily visually confirmed.

In general, the lead wire 53 of the anode body has a transverse cross sectional shape of a circle having an outer diameter of 0.1 mm to 0.5 mm or an approximately rectangle having a side length of 0.1 mm to 0.5 mm. Thus, the shape of the small holes 7 as viewed in plan from the lower side is preferably a circular shape having an inner diameter of larger than 0.1 mm and 0.55 mm or lower or a rectangular shape having one side of larger than 0.1 mm and 0.55 mm or lower. More specifically, as the shape of the small holes 7 as viewed in plan from the lower side, the small holes 7 are preferably larger than a 0.1 mm diameter circle and are equal to or smaller than a 0.55 mm square.

Or, as the shape of the small holes 7 as viewed in plan from the lower side, the small holes 7 are preferably set, in accordance with the transverse cross sectional shape of the lead wire 53 of the anode body to be inserted thereto, to be larger than the transverse cross sectional shape and is equal to or smaller than a similar figure in which the transverse cross sectional shape is enlarged by 1.1 times. For example, when the transverse cross sectional shape of the lead wire 53 of the anode body has a circular shape, the diameter of the small holes 7 are preferably set to be larger than the outer diameter of the lead wire 53 of the anode body to be inserted thereto and to be equal to or smaller than a diameter 1.1 times larger than the outer diameter. More specifically, when the outer diameter of the lead wire 53 is 0.29 mm, the diameter of the small holes 7 is preferably set to 0.30 mm to 0.31 mm.

By setting the size in the range mentioned above, the corrosion of the socket main units 2 (particularly insertion openings) can sufficiently be prevented. The small holes 7 may have a tapered portion. For example, the small holes 7 may be holes of an approximately pillar shape as illustrated in FIG. 3 and, in addition thereto, may be a hole of a truncated cone shape which downwardly extends as illustrated in FIG. 6(C).

In order to suppress the corrosion of the socket main units 2, the depth of the small holes 7 may be larger. However, in order to reduce the length of the lead wire 53 of the anode body to reduce the cost of materials, the depth may be smaller. Thus, the range of the depth of the small holes 7 is preferably 0.2 mm to 8 mm, more preferably 0.5 mm to 6 mm, and still more preferably 1 mm to 3 mm. When the transverse cross sectional shape of the small holes 7 (When the transverse cross sectional shape is uniform, the transverse cross sectional shape is in agreement with the shape of the small holes 7 as viewed in plan from the lower side) has a portion exceeding all the dimension ranges of the shape of the small holes 7 as viewed in plan from the lower side. e.g., when the small holes 7 have a tapered portion, it is more preferable to set the depth of the small holes 7 not including the portion to be equal to or lower than the lower limit of the depth range mentioned above.

Thus, the entire socket main units 2 are accommodated in the receiving unit 6 of the insulator part 5 and also a gap 9 between the accommodated socket main units 2 and the insulator part 5 is filled up with a filler 3, such as a low melting glass (for example, glass whose melting point is 600° C.), so that the socket main units 2 and the receiving unit 6 are welded or the like, whereby the socket main units 2 are secured in the receiving units 6 of the insulator part 5 (FIG. 3). In the secured state, the lead wire insertion openings 37 of the socket main units 2 and the small holes 7 of the insulator part 5 are connected to each other (FIG. 3). An upper surface 3*a* of the enclosed glass 3 is located at a position lower than the upper surface 5*a* of the insulator part 5 (FIG. 3). An upper surface 2*a* of the socket main units 2 is located at a position lower than the upper surface 5*a* of the insulator part 5 (FIG. 3).

Figure 1:
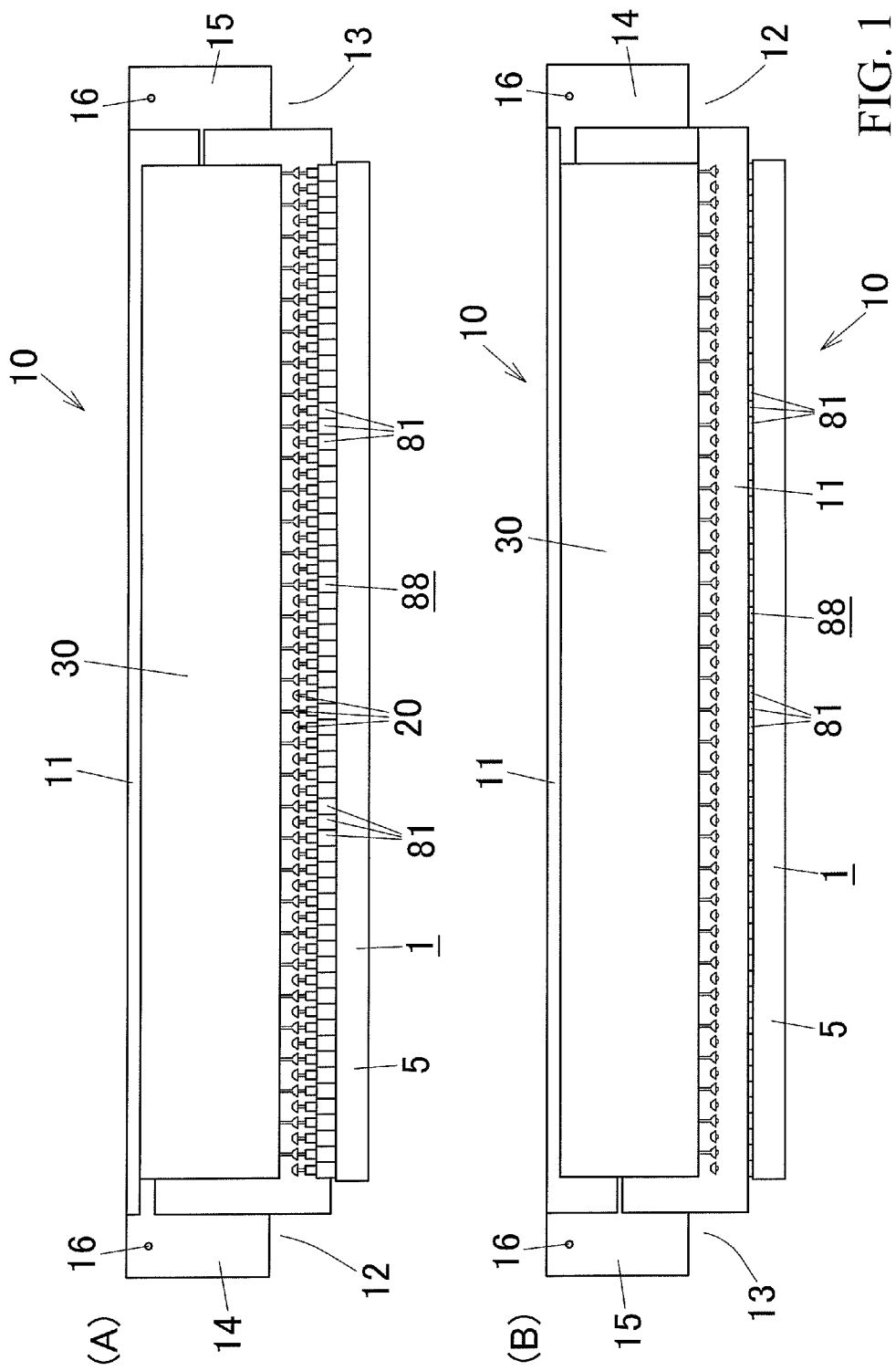
Figure 2:
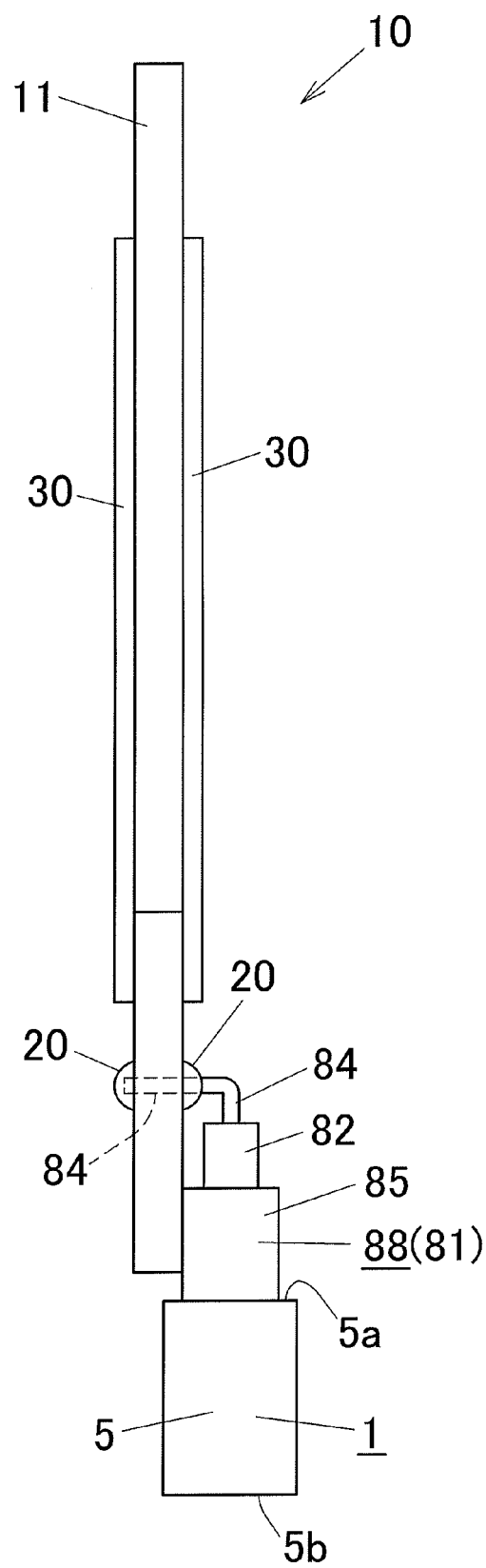
FIG. 2 is a left side view of the capacitor element manufacturing jig of FIG. 1.

When the gang socket 1 according to the configuration described above is attached to the connection portion 88 attached to the circuit board 11, for example, as described later, the vertical position (attachment height of the gang socket 1 of the invention) of the attachment of the gang socket 1 can be accurately determined by attaching in such a manner that the upper surface 5*a* of the insulator part 5 abuts on the lower surface of the connection portion 88 (FIGS. 1 and 2).

The heat resistance temperature of the gang socket 1 according to the configuration described above is dependent on the low melting glass. The gang socket 1 is usually used at a temperature equal to or lower than the deformation temperature of the used low melting glass.

Figure 6:
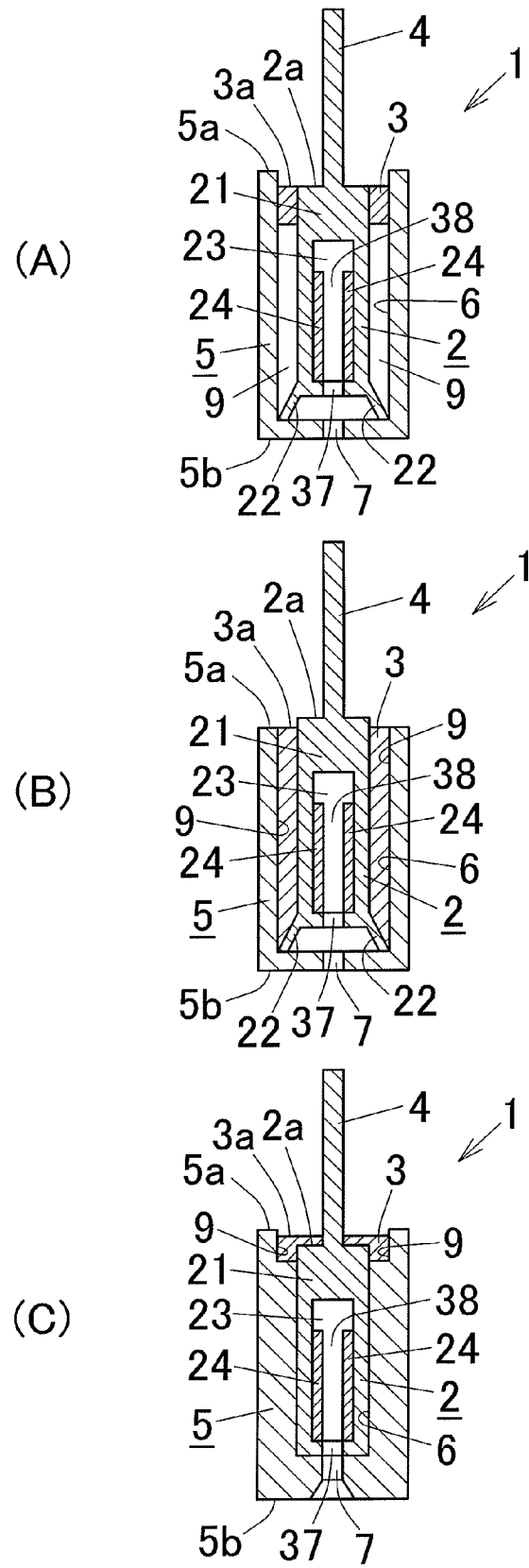
FIGS. 6(A), 6(B), and 6(C) are all cross sectional views illustrating another embodiment of the gang socket of the invention.

Next, another embodiment of the gang socket 1 according to the invention is illustrated in FIG. 6. In the configuration illustrated in FIG. 6(A), the entire socket main units 2 are accommodated in the receiving unit 6 of the insulator part 5 and also only an upper portion in the gap 9 between the accommodated socket main units 2 and the insulator part 5 is filled with the glass material 3, such as low melting glass, whereby the socket main units 2 are secured into the receiving units 6 of the insulator part 5. In the secured state, the lead wire insertion openings 37 of the socket main units 2 and the small holes 7 of the insulator part 5 are connected to each other. The upper surface 3*a* of the enclosed glass 3 is located at a position lower than the upper surface 5*a* of the insulator part 5. The upper surface 2*a* of the socket main units 2 is located at a position lower than the upper surface 5*a* of the insulator part 5. Thus, when the gang socket 1 illustrated in FIG. 6(A) is attached to the connection portion 88 attached to the circuit board 11, for example, as described later, the vertical position (attachment height of the gang socket 1 of the invention) of the attachment of the gang socket 1 can be accurately determined by attaching in such a manner that the upper surface 5*a* of the insulator part 5 abuts on the lower surface of the connection portion 88.

In the configuration illustrated in FIG. 6(B), a part of the socket main units 2 is accommodated in the receiving unit 6 of the insulator part 5 and also the gap 9 between the accommodated socket main units 2 and the insulator part 5 is filled with the glass material 3, such as low melting glass, whereby the socket main units 2 are secured into the receiving unit 6 of the insulator part 5. In the secured state, the lead wire insertion openings 37 of the socket main units 2 and the small holes 7 of the insulator part 5 are connected to each other. The upper surface 3*a* of the enclosed glass 3 is located at a position lower than the upper surface 2*a* of the socket main units 2. The upper surface 2*a* of the socket main units 2 is located at a position higher than the upper surface 5*a* of the insulator part 5. Thus, when the gang socket 1 illustrated in FIG. 6(B) is attached to the connection portion 88 attached to the circuit board 11, for example, as described later, the vertical position (attachment height of the gang socket 1 of the invention) of the attachment of the gang socket 1 can be accurately determined by attaching in such a manner that the upper surface 2*a* of the socket main units 2 abuts on the lower surface of the connection portion 88.

In the configuration illustrated in FIG. 6(C), the entire socket main units 2 are accommodated in the receiving unit 6 of the insulator part 5. The gap 9 is not present between the accommodated socket main units 2 and the insulator part 5 except for an upper region and the gap 9 is present in the upper region between the socket main units 2 and the insulator part 5. By filling the gap 9 with the glass material 3, such as low melting glass, the socket main units 2 are secured into the receiving unit 6 of the insulator part 5. In the secured state, the lead wire insertion openings 37 of the socket main units 2 and the small holes 7 of the insulator part 5 are connected to each other. The upper surface 2*a* of the socket main units 2 is located at a position lower than the upper surface 5*a* of the insulator part 5. The glass material 3, such as low melting glass, is enclosed also in the upper surface 2a of the socket main units 2 and the upper surface 3a of the enclosed glass 3 is located at a position lower than the upper surface 5a of the insulator part 5. Thus, when the gang socket 1 illustrated in FIG. 6(C) is attached to the connection portion 88 attached to the circuit board 11, for example, as described later, the vertical position (attachment height of the gang socket 1 of the invention) of the attachment of the gang socket 1 can be accurately determined by attaching in such a manner that the upper surface 5a of the insulator part 5 abuts on the lower surface of the connection portion 88.

Next, one embodiment of a capacitor element manufacturing jig 10 according to the invention is illustrated in FIGS. 1 and 2. The capacitor element manufacturing jig 10 is constituted using the gang socket 1 of the invention described above. The capacitor element manufacturing jig 10 has the circuit board 11 and the gang socket 1.

As the circuit board 11, an insulating board is used. The material of the insulating substrate is not particularly limited and, for example, glass epoxy resin, imide resin, ceramics, and the like are mentioned.

On the surface of the circuit board 11, an electrical circuit 30 having a pair of electrical connection terminals 14 and 15 is formed as illustrated in FIG. 1. The electrical circuit 30 has a circuit which limits a current (for example, circuits of FIGS. 10 and 11 and the like) and supplies a current independently in each anode body 52 through the gang socket 1 of the invention and the lead wire 53 connected thereto.

Thus, the highest current value flowing into each anode body 52 becomes a current limit value of the circuit. The circuit which limits a current is preferably a constant current circuit (for example, FIG. 10) in order to reduce the deviation of a capacitor to be obtained as much as possible. The electrical circuit 30 is more preferably a circuit which further limits a voltage to be applied to each anode body 52. Even when a relatively high current is supplied, the greatest voltage value to be applied to the anode body 52 is limited. Thus, the treatment time of the chemical conversion or the semiconductor layer formation can be shortened.

With respect to the pair of electrical connection terminal 14 and 15, one terminal 14 is provided at one end portion in the longitudinal direction of the circuit board 11 and the other terminal 15 is provided at the other end portion in the longitudinal direction of the circuit board 11. One electrical connection terminal is a current limiting terminal 14, and the current limit value is set based on the voltage supplied to the terminal 14. For example, in the case of the circuit of FIG. 10, the current limit value can set based on a potential difference between the current limiting terminal 14 and a voltage limiting terminal 15 described later. In the case of the circuit of FIG. 11, the current limit value can set based on a potential difference between the current limiting terminal 14 and a cathode plate 51.

Figure 10:
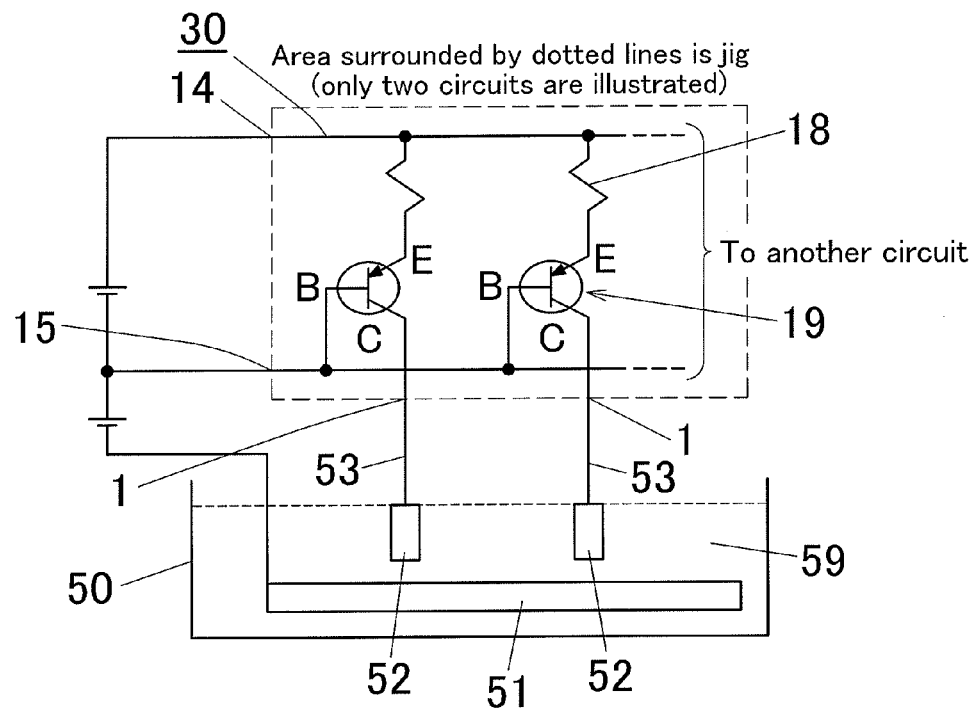
FIG. 10 is a schematic view illustrating a method for manufacturing a capacitor element of the invention as an electrical circuit (As the circuit in the capacitor element manufacturing jig, only two circuits are illustrated).
Figure 11:
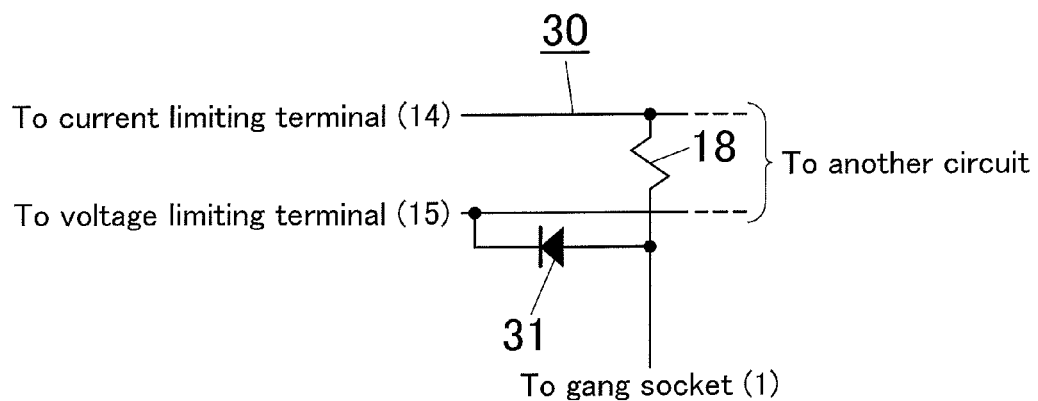
FIG. 11 is a circuit diagram illustrating another example of an electrical connection circuit in a circuit board of the capacitor element manufacturing jig.

The other electrical connection terminal is a voltage limiting terminal 15. The highest voltage value to be applied to each anode body 52 is limited based on the voltage supplied to the terminal 15. For example, in the case of the circuits of FIGS. 10 and 11, the highest voltage value can be set based on a potential difference between the voltage limiting terminal 15 and the cathode plate 51. In FIGS. 10 and 11, 18 denotes a resistor, 19 denotes a transistor, and 31 denotes a diode.

The gang socket 1 is attached to the lower end portion of the circuit board 11. More specifically, as illustrated in FIGS. 1 and 2, the connection portion 88 of the gang socket 1 is secured to the circuit board 11, a lead wire portion 84 upwardly extended from each connection portion 81 is bent at an angle of about 90° in a curved manner, and then the top end portion of the lead wire portion 84 is inserted into each penetration hole provided in the lower portion of the circuit board 11 and is attached to the circuit board 11 with a solder 20 (FIG. 2).

In FIGS. 1 and 2, a general gang socket (sometimes referred to as a "first row gang socket 88" in order to distinguish the gang socket from the gang socket 1) capable of connecting the gang socket 1 is used as the connection portion 88.

Figure 9:
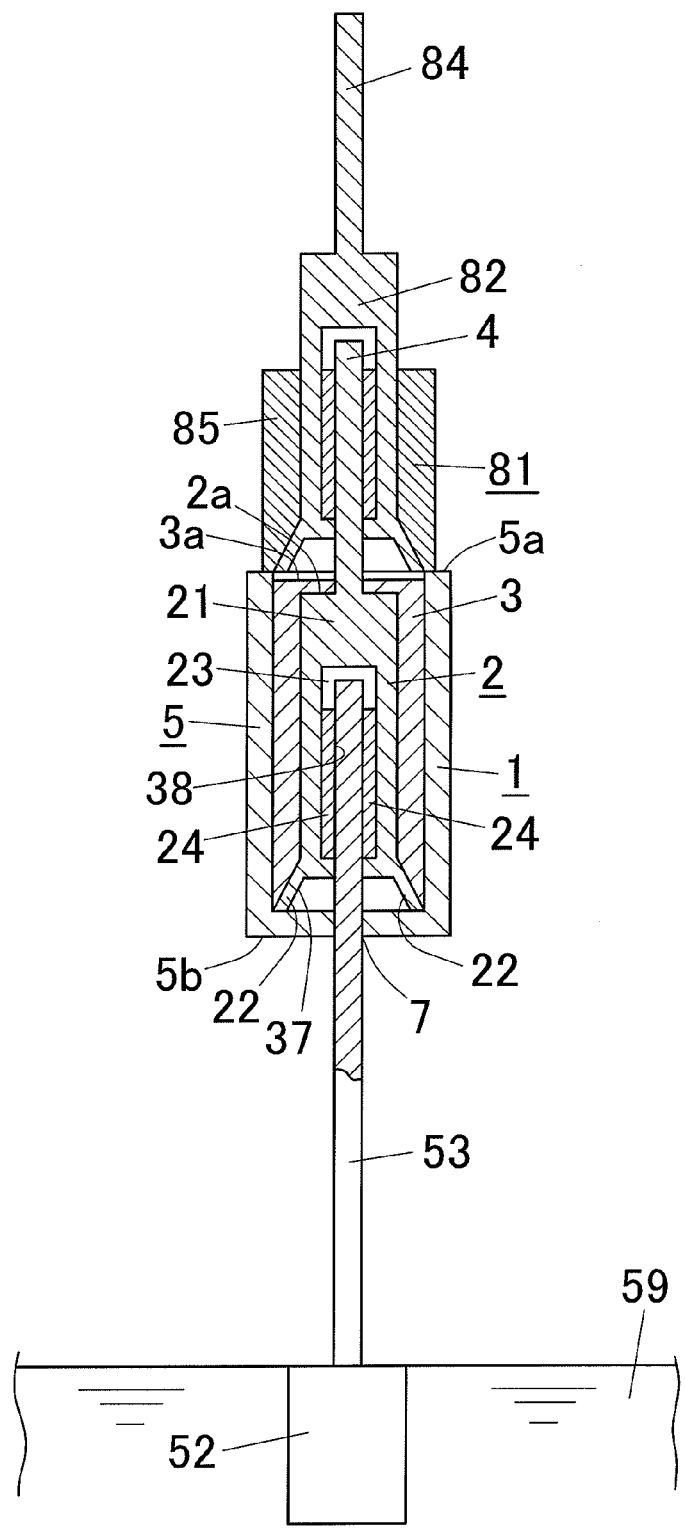
FIG. 9 is a cross sectional view illustrating a connection manner of a socket and an anode body in FIG. 8.

Then, the lead wire portion 4 of each of the socket main units 2 of the gang socket 1 of the invention is inserted and connected to the insertion opening in the bottom surface of each of the connection portions 81 attached to the circuit board 11, whereby the gang socket 1 is attached to the lower end portion of the circuit board 11 (FIGS. 1, 2, and 9). The gang socket 1 (parallel gang socket 1 in which the plurality of socket main units 2 are connected in one row through the insulator part 5) is attached to the circuit board 11 in such an aspect, whereby the capacitor element manufacturing jig 10 of the invention is constituted. In the connection portion 88 illustrated in FIG. 2, 82 denotes a conductive socket main unit and 85 denotes an insulator part formed with resin.

In the invention, an electrical connection circuit of the circuit board 11 of the capacitor element manufacturing jig 10 is not particularly limited to one having the configuration illustrated in FIG. 10 and may have a circuit configuration illustrated in FIG. 11, for example.

Figure 8:
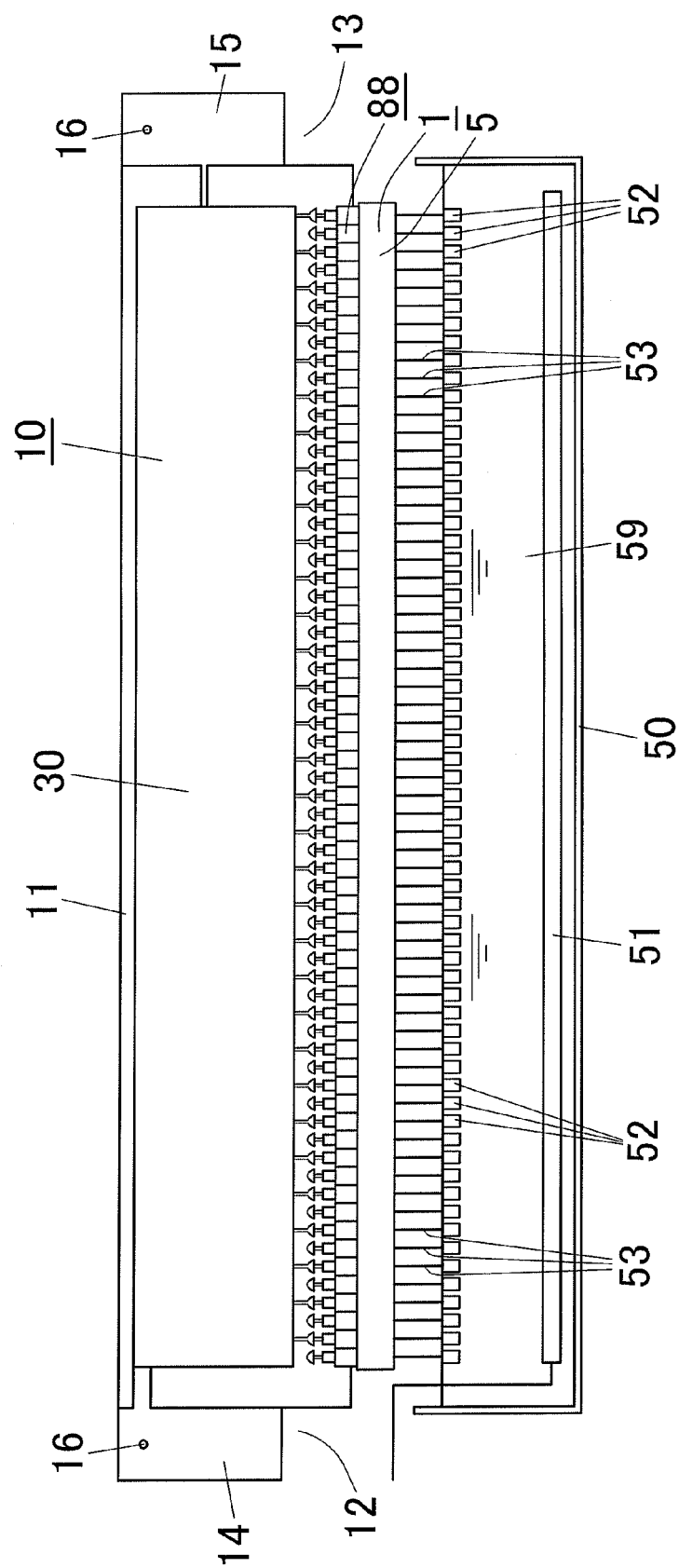
FIG. 8 is an outline view illustrating a method for manufacturing a capacitor element using a capacitor element manufacturing jig of the invention.

Next, a method for manufacturing a capacitor element using the capacitor element manufacturing jig 10 described above is described. FIG. 8 illustrates one example of a method for manufacturing a capacitor element in an outline view. FIG. 10 is a schematic view illustrating a method for manufacturing a capacitor element as an electrical circuit.

First, a treatment container 50 in which a treatment liquid 59 is put is prepared. As the treatment liquid 59, a chemical conversion treatment liquid for forming the dielectric layer 54, a semiconductor layer forming liquid for forming a semiconductor layer 55, and the like are mentioned.

Separately, the anode body 52 having the lead wire 53 is connected to the gang socket 1 of the capacitor element manufacturing jig 10. More specifically, by inserting the lead wire 53 of the anode body 52 into the lead wire insertion hole 38 through the lead wire insertion opening 37 of the gang socket 1 of the capacitor element manufacturing jig 10, the anode body 52 is electrically connected to the gang socket 1 (FIG. 9). Since the top end side of the lead wire 53 contacts the metal spring member 24 in the hollow portions 23 of the socket main units 2, the gang socket 1 and the anode body 52 are electrically connected.

Subsequently, the capacitor element manufacturing jig 10 in which the anode body 52 is set is disposed at the upper position of the treatment container 50, the jig 10 is lowered (or the treatment container 50 is raised) until at least one part (usually entire) of the anode body 52 is immersed in the treatment liquid 59, and then the jig 10 is secured at the height (FIG. 8).

In the immersed state of the anode body 52, energization is performed while using the anode body 52 as an anode and using the cathode plate 51 disposed in the treatment liquid 59 as a cathode (FIGS. 8 and 10). When the chemical conversion treatment liquid is used as a first treatment liquid 59, the dielectric layer 54 (FIG. 12) can be formed on the surface of the anode body 52 by the energization (dielectric layer formation process).

Figure 12:
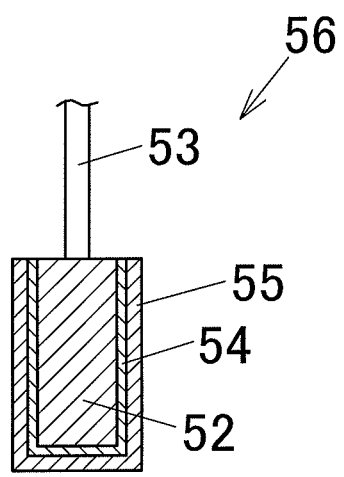
FIG. 12 is a partial cross sectional view illustrating one embodiment of a capacitor element manufactured by a manufacturing method according to the invention.

Subsequently, the anode body 52 having the dielectric layer 54 on the surface is washed with water and dried as required, the semiconductor layer forming liquid 59 is newly put into another treatment container 50 different from the treatment container above, the jig 10 is lowered until at least one part (usually entire) of the anode body 52 is immersed in the semiconductor layer forming liquid 59 in the same manner as above, and then the jig 10 is secured at the height. Then, when energization is performed while using the anode body 52 as an anode and using the cathode plate 51 disposed in the semiconductor layer forming liquid 59 as a cathode, more specifically, when energization is performed using the semiconductor layer forming liquid as a second treatment liquid 59, the semiconductor layer 55 can be formed on the surface of the dielectric layer 54 on the surface of the anode body 52 (semiconductor layer formation process). Thus, a capacitor element 56 in which the dielectric layer 54 is laminated on the surface of the anode body 52 and the semiconductor layer 55 is further laminated on the surface of the dielectric layer 54 can be manufactured (FIG. 12).

In the method for manufacturing a capacitor element according to the invention, for example, between the dielectric layer formation process and the semiconductor layer formation process and/or after the semiconductor layer formation process, the gang socket 1 to which the anode bodies 52 are connected is removed from the connection portion 88 of the circuit board 11 of the capacitor manufacturing jig 10, and the anode bodies 52 connected to the gang socket 1 is heat treated (heat treatment process). Since the gang socket 1 is detachably attached to the connection portion 88 electrically connected to the circuit board 11, the gang socket 1 (in the state where the anode bodies 52 are connected) can be removed from the connection portion 88, and only the gang socket 1 (in the state where the anode bodies 52 are connected) can be heat treated (The application of the heat treatment to the circuit board 11 and the like can be avoided).

The heat treatment is performed for the purpose of mainly increasing the reliability of the capacitor, and the timing for the heat treatment varies depending on the intended use. The heating temperature of the heat treatment performed between the dielectric layer formation process and the semiconductor layer formation process is usually 200° C. to 500° C. The heating temperature of the heat treatment performed between the semiconductor layer formation process and a carbon paste formation process is usually 150° C. to 300° C. The heating temperature of the heat treatment performed between the carbon paste formation process and a silver paste formation process is usually 150° C. to 300° C.

The atmosphere in the heat treatment is preferably an inactive gas atmosphere, such as argon gas, or a reduced pressure atmosphere. Since nitrogen reacts with anode body materials, such as niobium, even at a temperature of about 300° C., nitrogen is not used as the inactive gas.

In order to further perform treatment after the heat treatment, the gang socket 1 (in the state where the anode bodies 52 are connected) may be attached to the connection portion 88 again after the heat treatment, and electrically connected.

In the heat treatment process above, a reason why the heat treatment is not performed in a state where only the anode bodies 52 are removed and the heat treatment is performed to the gang socket 1 to which the anode bodies 52 are connected after the gang socket 1 to which the anode bodies 52 are connected is removed from the connection portion 88 of the circuit board 11 resides in that when only the anode bodies 52 are removed from the gang socket 1, there is a possibility of damaging the dielectric layer 54 and the semiconductor layer 55 already formed on the anode body 52. This is also because when requiring further treatment after the heat treatment in the case where only the anode bodies 52 are removed from the gang socket 1, the anode bodies 52 are required to be attached again to the gang socket 1, and there is a possibility of similarly damaging the dielectric layer 54 and the semiconductor layer 55 already formed on the anode body 52 in this case.

The size of the gang socket 1 is not particularly limited and may be adjusted to the size according to the arrangement of the capacitor element when immersed in the treatment liquid 59, the size which allows easy handling according to a device which conveys the gang socket 1, and the like.

The anode body 52 is not particularly limited and at least one anode body selected from the group consisting of valve action metals and conductive oxides of valve action metals, can be mentioned, for example. As a specific example thereof, aluminum, tantalum, niobium, titanium, zirconium, niobium monoxide, zirconium monoxide, and the like are mentioned. Or, a laminate in which the anode body is laminated on the surface of a base substance may be acceptable. As an example of the laminate in which the anode body is laminated on a surface layer, a laminate in which the anode body is laminated on a base substance, such as paper, insulating polymer, and glass, and the like are mentioned.

The shape of the anode body 52 is not particularly limited and a foil shape, a plate shape, a cylindrical shape, a rectangular parallelepiped shape, and the like are mentioned.

The chemical conversion treatment liquid 59 is not particularly limited and, for example, a liquid in which known electrolytes, such as organic acids or salts thereof (for example, adipic acid, acetic acid, ammonium adipate, benzoic acid, and the like) or inorganic acids or salts thereof (for example, phosphoric acid, silicic acid, ammonium phosphate, ammonium silicate, sulfuric acid, ammonium sulfate, and the like) is dissolved or suspended and the like are mentioned. By performing the energization using such a chemical conversion treatment liquid, the dielectric layer 54 containing an insulating metal oxide, such as $Ta_2O_5$, $Al_2O_3$, $Zr_2O_3$, and $Nb_2O_5$, can be formed on the surface of the anode body 52.

The dielectric layer formation process using such a chemical conversion treatment liquid may be omitted, and the anode body 52 on the surface of which the dielectric layer 54 is already provided may be subjected to the semiconductor layer formation process. As the dielectric layer 54 on the surface, a dielectric layer containing at least one selected from insulating oxides as the main component and a dielectric layer known in the fields of a ceramic capacitor and a film capacitor are mentioned.

The semiconductor layer forming liquid 59 is not particularly limited insofar as the solution can form a semiconductor by energization. For example, a solution and the like containing aniline, thiophene, pyrrole, methylpyrrole, substituted derivatives thereof (for example, 3,4-ethylenedioxythiophene and the like), and the like, are mentioned. A dopant may be further added to the semiconductor layer forming liquid 59. The dopant is not particularly limited and, for example, known dopants, such as aryl sulfonic acid or a salt thereof, alkyl sulfonic acid or a salt thereof, various polymeric sulfonic acids or salts thereof, and the like are mentioned. By performing the energization using such a semiconductor layer forming liquid 59, the semiconductor layer 55 containing, for example, conductive polymers (for example, polyaniline, polythiophene, polypyrrole, polymethylpyrrole, and the like) can be formed on the surface of the dielectric layer 54 on the surface of the anode body 52.

In the invention, on the semiconductor layer 55 of the capacitor element 56 obtained by the manufacturing method described above, an electrode layer may be provided in order to improve electrical contact with an external lead-out terminal (for example, lead frame) of a capacitor.

The electrode layer can be formed by, for example, solidification of a conductive paste, plating, metal vapor deposition, formation of a heat-resistant conductive resin film, and the like. As the conductive paste, silver paste, copper paste, aluminum paste, carbon paste, nickel paste, and the like are preferable.

To each of the anode body 52 and the semiconductor layer 55 of the capacitor element 56 thus obtained, an electrode terminal is electrically connected (for example, the lead wire 53 is welded to one electrode terminal and the electrode layer (semiconductor layer) 55 is attached to the other electrode terminal with silver paste or the like), and then sealing is performed while leaving a part of the electrode terminals, whereby a capacitor is obtained.

The sealing method is not particularly limited and resin mold sheathing, resin case sheathing, metal case sheathing, sheathing by dipping of resin, sheathing by a laminate film, and the like are mentioned, for example. Among the above, since a reduction in size and a reduction in cost can be easily achieved, resin mold sheathing is preferable.

EXAMPLES

Next, specific Examples of the invention are described but the invention is not particularly limited to the Examples.

Example 1

[Production of Anode Body 52]

By granulating niobium primary powder (average particle diameter of 0.32 μm) obtained by pulverizing a niobium (Nb) ingot utilizing hydrogen brittleness, niobium powder having an average particle diameter of 124 μm was obtained (The niobium powder has a naturally-oxidized surface and contains 8900 ppm of oxygen). Next, the obtained niobium powder was allowed to stand in a 450° C. nitrogen atmosphere, and further allowed to stand in a 700° C. argon atmosphere, whereby partially-nitrided niobium powder (CV value: 290000 μF·V/g) having a nitride amount of 8000 ppm was obtained. The partially-nitrided niobium powder was molded with a niobium wire (lead wire) having a diameter of 0.29 mm, and then sintered at 1270° C., whereby a sintered body (anode body) 52 having a rectangular parallelepiped shape of 2.3 mm in length×1.7 mm in width×1.0 mm in thickness was produced. The niobium lead wire 53 is integrally molded in such a manner that the lead wire 53 is buried in the sintered body 52 at a position inwardly positioned from the surface of 1.7 mm×1.0 mm of the sintered body 52 by 1.3 mm and outwardly projected by 10 mm from the center of the surface.

[Production of Gang Socket 1 of Invention]

The parallel gang socket 1 having the configuration illustrated in FIGS. 3 to 5 was produced. The insulator part 5 contains an alumina sintered body obtained by sintering alumina powder. The diameter of the small holes 7 is 0.306 mm±0.012 mm and the depth of the small holes 7 is 1.6 mm. On the upper surface 5a of the insulator part 5, 64 receiving units 6 are formed at equal intervals (2.54 mm pitch) (FIG. 5). One small hole 7 (64 holes in total) connecting to the bottom surface is formed immediately under the bottom surface of each of the receiving units 6 in the lower surface 5b of the insulator part 5 (FIGS. 3 and 4). Each of the 64 socket main units 2 was accommodated in each of the receiving units 6 of the insulator part 5 and also the gap 9 between each of the accommodated socket main units 2 and the insulator part 5 was filled with a low melting glass (glass whose melting point is 400° C.) powder. Then, the powder was melted for sticking them to thereby fix each of the socket main units 2 into each of the receiving units 6 of the insulator part 5, whereby the parallel gang socket 1 was obtained (FIG. 3). In the gang socket 1, the lead wire insertion openings 37 of the socket main units 2 and the small holes 7 of the insulator part 5 are connected to each other (FIG. 3). The upper surface 3a of the enclosed glass 3 is located at a position lower than the upper surface 5a of the insulator part 5 and the upper surface 2a of the socket main units 2 is located at a position lower than the upper surface 5a of the insulator part 5 (FIG. 3).

[Production of Solid Electrolytic Capacitor Element Manufacturing Jig of Invention]

A copper-clad glass epoxy board (circuit board) 11 of 194.0 mm in length×33.0 mm in width×1.6 mm in thickness was prepared (FIG. 1). The copper-clad glass epoxy board 11 is provided with 10 mm×8 mm cut-out portions 12 and 13 at one end side (lower side in the drawing) in the width direction (vertical direction in the drawing) at both end portions in the longitudinal direction (horizontal direction in the drawing). Electrical terminal portions 14 and 15 with a size of 23 mm×8 mm are provided at upper regions of the cut-out portions 12 and 13, respectively (FIG. 1(A)). The current limiting terminal 14 is provided at the upper region of one cut-out portion 12 and the voltage limiting terminal 15 is provided at the upper region of the other cut-out portion 13 (FIG. 1(A)). The electrical terminal portion 14 (FIG. 1(A)) at the front surface side is electrically connected to the electrical terminal portion 14 (FIG. 1(B)) of the same area at the back surface side through a through hole 16 in the terminal portion 14. The electrical terminal portion 15 (FIG. 1(A)) at the front surface side is electrically connected to the electrical terminal portion 15 (FIG. 1(B)) of the same area at the back surface side through a through hole 16 in the terminal portion 15.

On the copper-clad glass epoxy board 11, the circuit of FIG. 10, i.e., 64 resistors 18 of 20 kΩ (1% of error) 18, 64 transistors (2SA2154GR) 19, and the first row gang socket 88 (manufactured by Preci-dip corporation, "PCD receptacle 399 series round pin DIP socket", 2.54 mm pitch, 64 pin gang socket) 88 as the connection portion 88 at only one surface (front surface) are mounted (FIGS. 1 and 2).

As illustrated in FIG. 2, the lead wire 84 of each of the connection portions 81 was upwardly extended from the upper surface of the socket main units 82, bent toward the board 11 at an angle of about 90° in a curved manner, inserted into each of 64 holes formed in the lower portion of the board 11, and then attached to the circuit board 11 with a solder 20.

Each lead wire 4 of the gang socket 1 of the invention was inserted into and connected to the lead wire insertion opening formed in a dented manner in the bottom surface of the first row gang socket 88, and the gang socket 1 of the invention was detachably connected to the lower portion of the first row gang socket 88 to thereby form a two-stage structure. Thus, a solid electrolytic capacitor element manufacturing jig 10 in which the gang socket 1 was detachably attached to the copper-clad glass epoxy board (circuit board) 11 was obtained (FIGS. 1 and 2). A second row gang socket 1 is used as an anode body 52 connection terminal.

As illustrated in FIG. 10, one resistor 18 and an emitter E of one transistor 19 mounted on the circuit board 11 are connected to each other and a collector C of the transistor 19 is electrically connected to one socket main units 2 of the gang socket 1. The other side of the resistor 18 is connected to the current limiting terminal 14. A base B of the transistor 19 is connected to the voltage limiting terminal 15.

[Manufacturing of Capacitor Element]

A niobium lead wire 53 of the anode body (conductive sintered body) 52 was inserted into each lead wire insertion hole 38 of the gang socket 1 of the solid electrolytic capacitor element manufacturing jig 10 to be electrically connected thereto (FIGS. 8 and 9). The heights of the 64 anode bodies (conductive sintered body) 52 were made uniform and the directions were also made uniform as illustrated in FIG. 8. Ten capacitor element producing jigs 10 each having sixteen four anode bodies 52 connected thereto as described above were prepared, and attached to a holding frame in which the jigs are arranged in parallel in such a manner that the connected anode bodies 52 were downwardly suspended. The holding frame has a socket into which the electrical connection terminals 14 and 15 of the capacitor element manufacturing jig 10 are inserted. The holding frame was disposed at an upper position of a metallic (stainless steel) treatment container 50 containing a 1% by mass aqueous phosphoric acid solution (chemical conversion treatment liquid) 59 (FIG. 8). The 10 capacitor element manufacturing jigs 10 were attached in parallel to the holding frame at intervals of 8 mm. The metallic treatment container 50 also functions as the cathode plate 51.

The holding frame was operated, so that the jigs 10 were lowered in such a manner that the entire anode bodies 52 and a 5 mm length portion of the lower end portion of the lead wire 53 were immersed in the treatment liquid 59, and secured at the height. In this immersed state, a voltage was applied between the voltage limiting terminal 15 and the cathode plate 51 (containing the metallic treatment container 50) in such a manner that the voltage limiting value (chemical conversion voltage) became 8.3 V and a voltage was applied between the current limiting terminal 14 and the voltage limiting terminal 15 in such a manner that the current limiting value became 2.1 mA for energization. In the state where the temperature of the chemical conversion treatment liquid 59 was maintained at 65° C., anodization was performed for 8 hours. Thus, the dielectric layer 54 was formed on the pores and the outer surface of the conductive sintered body 52 and the surface of a part (5 mm length portion) of the lead wire. Under the anodization, for 4 hours of the second half from the passage of 4 hours to the passage of 8 hours, the current limit value was continuously reduced at a rate of 0.5 mA per hour (dielectric layer formation process).

The anode body 52 having the dielectric layer 54 on the surface was washed with water and dried, and then immersed in a 20% by mass ethylene dioxythiophene ethanol solution. Separately, the semiconductor layer forming liquid 59 (a solution in which 0.4% by mass of ethylene dioxythiophene and 0.6% by mass of anthraquinone sulfonic acid were compounded in a mixed solvent containing 30 parts by mass of water and 70 parts by mass of ethylene glycol) was put into another treatment container 50 different from the treatment container 50 above, and then the jig 10 was lowered in such a manner that the entire anode bodies 52 each having the dielectric layer 54 on the surface and a 5 mm length portion of the lower end portion of the lead wire 53 were immersed in the semiconductor layer forming liquid 59, and secured at the height. In the immersed state, electrolytic polymerization was performed at 20° C. for 1 hour.

In the electrolytic polymerization, the voltage limit value was set to 10 V and the current limit value was set to 44 μA for the first 15 minutes. For the next 15 minutes, the voltage limit value was set to 10 V and the current limit value was set to 82 μA. For the last 30 minutes, the voltage limit value was set to 10 V and the current limit value was set to 101 μA.

By performing the 1 hour electrolytic polymerization 6 times (electrolytic polymerization for 6 hours in total), the semiconductor layer 55 containing a conductive polymer was formed on the surface of the dielectric layer 54 of the anode body 52 on the surface of which the dielectric layer 54 was formed (semiconductor layer formation process).

Subsequently, by performing re-chemical conversion, the dielectric layer 54 was repaired. The re-chemical conversion was performed at a controlled voltage of 6.3V and a controlled current of 0.1 mA for 15 minutes using the same solution as that of the anodization (First re-chemical conversion treatment process).

Next, a carbon paste (manufactured by Acheson, "Electrodag PR-406") was applied to the surface of the semiconductor layer 55, and then dried at 125° C. (carbon paste application process).

Next, the gang socket 1 (in the state where the anode bodies 52 on each of which the dielectric layer 54, the semiconductor layer 55, and the carbon paste were laminated were connected) was removed from the first row gang socket 88 of the capacitor element manufacturing jig 10, and then the gang socket 1 was allowed to stand at 190° C. for 30 minutes under reduced pressure of a gauge pressure of minus 99 KPa to be heat treated (first heat treatment process). After returning to room temperature, 1% oxygen containing nitrogen gas was supplied into a pressure reducing device in such a manner that the gauge pressure became minus 80 KPa, and then it was allowed to stand for 30 minutes. Thereafter, the pressure was returned to reduced pressure of a gauge pressure of minus 99 KPa. The sequence of operations of supplying oxygen containing nitrogen gas and then returning the pressure to reduced pressure of a gauge pressure of minus 99 KPa was further repeated 8 times, air was supplied into the pressure reducing device, and then the gang socket 1 (in the state where the anode bodies 52 on each of which the dielectric layer 54, the semiconductor layer 55, and the carbon paste were laminated were connected) was taken out from the pressure reducing device.

Next, each lead wire 4 of the gang socket 1 (in the state where the anode bodies 52 on each of which the dielectric layer 54 and the semiconductor layer 55 were laminated were connected) was inserted into each lead wire insertion opening in the bottom surface of the first row gang socket 88 of the capacitor element manufacturing jig 10 again, and then connected (electrically connected). Ten capacitor element manufacturing jigs 10 to which the gang socket 1 was attached as described above were prepared, attached to a holding frame in the same manner as above, and then re-chemical conversion was performed under the same conditions as those of the first re-chemical conversion after the polymerization (second re-chemical conversion treatment process).

Next, the anode body 52 on which the dielectric layer 54, the semiconductor layer 55, and the carbon paste were laminated was washed with water and then dried. Thereafter, a silver paste was laminated on the surface of the carbon paste layer to thereby form the anode body layer (silver paste lamination process), thereby obtaining the capacitor element 56.

[Manufacturing of Capacitor]

Next, the capacitor element 56 was placed on a lead frame, an anode lead wire (semiconductor side) of the capacitor element was connected to an anode terminal of the lead frame, the anode body 52 of the capacitor element was connected to a cathode terminal of the lead frame, and then transfer sealing and aging were performed, thereby producing 640 niobium solid electrolytic capacitors having a size of 3.5 mm×2.8 mm×1.8 mm, a rating of 2.5 V, and a capacity of 330 μF.

[Load Test]

500 capacitors of the produced 640 niobium solid electrolytic capacitors were soldered to a mounting board for the test by a reflow furnace. The reflow conditions were as follows; 30 seconds at a preheating of 225° C. and 3 seconds at a peak temperature of 250° C. The capacitor thus mounted was subjected to a load test at a temperature of 110° C. and at an applied voltage of 2.5 V for 2000 hours using a load test device. Thereafter, the leak current value at 2.5 V of the niobium solid electrolytic capacitors was actually measured. As a result, the values of all the 500 niobium solid electrolytic capacitors were within 0.1 CVμA. Herein, 0.1 CV is a numerical value obtained by multiplying the product of the capacity of the capacitor and the rated voltage by 0.1. For example, when the measured capacity of the capacitor is 335 μF and the rated voltage is 2.5 V, 0.1×335×2.5=83.75 is given.

[Moisture Resistance test]

20 capacitors of the produced 640 niobium solid electrolytic capacitors were mounted on a substrate in a reflow furnace having a temperature pattern of a peak temperature of 260° C. for 5 seconds and a peak temperature of 230° C. or higher for 30 seconds. The capacitor thus mounted was placed in a 60° C. 90% RH thermohygrostat, and was allowed to stand in a state of not applying a voltage for 2000 hours. Then, the capacitor was measured for the leak current after 30 seconds passed after applying 2.5V at room temperature. As a result, the leak current values of all the 20 niobium solid electrolytic capacitors were within 0.1 CVμA.

[Cycle Test]

While continuously using the same gang socket 1, the production of the capacitor element 56 was further performed 49 times (50 times in total). In the 50th production, the processes to the manufacturing of a capacitor were performed, and then a load test and a moisture resistance test were carried out. The gang socket 1 used in the 50th production was decomposed, the socket main units 2 were taken out. Then, the corrosion state was observed. As a result, in the load test and the moisture resistance test, the value of all the tested capacitors were within 0.1 CVμA, and the corrosion of the socket main units 2 was not observed.

Example 2

640 niobium solid electrolytic capacitors having a size of 3.5 mm×2.8 mm×1.8 mm, a rating of 2.5 V, and a capacity of 330 μF were produced in the same manner as in Example 1, except adding the following second heat treatment process between the semiconductor layer formation process and the first re-chemical conversion treatment process and omitting the first heat treatment process and the second re-chemical conversion treatment process after the carbon paste application process (i.e., a silver paste was laminated as it was after the carbon paste application).

In the second heat treatment process, the gang socket 1 (in the state where the anode bodies 52 on each of which the dielectric layer 54 and the semiconductor layer 55 were laminated were connected) was removed from the first row gang socket 88 of the capacitor element manufacturing jig 10, and then the gang socket 1 was allowed to stand at 220° C. for 5 minutes under reduced pressure of a gauge pressure of minus 99 KPa to be heat treated. After the heat treatment, the temperature was returned to room temperature, the gang socket 1 was taken out from the pressure reducing device after passing through the treatment in the pressure reducing device in the same manner as in Example 1. Subsequently, each lead wire 4 of the gang socket 1 (in the state where the anode bodies 52 on each of which the dielectric layer 54 and the semiconductor layer 55 were laminated were connected) was inserted into each lead wire insertion opening in the bottom surface of the first row gang socket 88 of the capacitor element manufacturing jig 10 again, and then connected (electrically connected). Then, the process proceeded to the following first re-chemical conversion treatment process.

The produced niobium solid electrolytic capacitors were subjected to a load test and a moisture resistance test in the same manner as in Example 1. As a result, in the load test, the values of all the 500 niobium solid electrolytic capacitors were within 0.1 CVμA. In the moisture resistance test, the values of all the 20 niobium solid electrolytic capacitors were within 0.1 CVμA.

Furthermore, the cycle test was performed in the same manner as in Example 1. As a result, in the load test and the moisture resistance test, the values of all the tested capacitors were within 0.1 CVμA. The corrosion of the socket main units 2 was not observed.

Example 3

640 niobium solid electrolytic capacitors having a size of 3.5 mm×2.8 mm×1.8 mm, a rating of 2.5 V, and a capacity of 330 μF were produced in the same manner as in Example 1, except adding the following third heat treatment process between the dielectric layer formation process and the semiconductor layer formation process and omitting the first heat treatment process and the second re-chemical conversion treatment process after the carbon paste application process (i.e., a silver paste was laminated as it was after the carbon paste application).

In the third heat treatment process, the gang socket 1 (in the state where the anode bodies 52 on each of which the dielectric layer 54 and the semiconductor layer 55 were laminated were connected) was removed from the first row gang socket 88 of the capacitor element manufacturing jig 10, and then the gang socket 1 was put in an argon gas atmosphere furnace with an oxygen partial pressure of 2%, and then allowed to stand at 360° C. for 45 minutes to be heat treated. After the heat treatment, the temperature was returned to room temperature, the furnace was replaced by argon gas with an oxygen partial pressure of 5%, and then allowed to stand for 40 minutes. Subsequently, the furnace was replaced by argon gas with an oxygen partial pressure of 10%, and then allowed to stand for 30 minutes. Subsequently, the furnace was replaced by argon gas with an oxygen partial pressure of 15%, and then allowed to stand for 20 minutes. Thereafter, the gang socket 1 was taken out. Subsequently, each lead wire 4 of the gang socket 1 (in the state where the anode bodies 52 on each of which the dielectric layer 54 and the semiconductor layer 55 were laminated were connected) was inserted into each lead wire insertion opening in the bottom surface of the first row gang socket 88 of the capacitor element manufacturing jig 10 again, and then connected (electrically connected). The second dielectric layer formation was performed again under the same conditions as those of Example 1. Thereafter, the process proceeded to the following semiconductor layer formation process.

The produced niobium solid electrolytic capacitors were subjected to a load test and a moisture resistance test in the same manner as in Example 1. As a result, in the load test, the values of all the 500 niobium solid electrolytic capacitors were within 0.1 CVμA. In the moisture resistance test, the values of all the 20 niobium solid electrolytic capacitors were within 0.1 CVμA.

Furthermore, the cycle test was performed in the same manner as in Example 1. As a result, in the load test and the moisture resistance test, the values of all the tested capacitors were within 0.1 CVμA. The corrosion of the socket main units 2 was not observed.

Example 4

640 niobium solid electrolytic capacitors having a size of 3.5 mm×2.8 mm×1.8 mm, a rating of 2.5 V, and a capacity of 330 μF were produced in the same manner as in Example 1, except omitting the first heat treatment process and the second re-chemical conversion treatment process after the carbon paste application process (i.e., a silver paste was laminated as it was after the carbon paste application).

The produced niobium solid electrolytic capacitors were subjected to a load test and a moisture resistance test in the same manner as in Example 1. As a result, in the load test, in the 500 niobium solid electrolytic capacitors, the values of the 492 niobium solid electrolytic capacitors were 0.1 CVμA or lower, the values of the 6 niobium solid electrolytic capacitors were higher than 0.1 CVμA and 0.15 CVμA or lower, and the values of the 2 niobium solid electrolytic capacitors were higher than 0.15 CVμA and 0.2 CVμA or lower. In the moisture resistance test, in the 20 niobium solid electrolytic capacitors, the values of the 19 niobium solid electrolytic capacitors were 0.1 CVμA or lower and the value of the one niobium solid electrolytic capacitor was higher than 0.1 CVμA and 0.15 CVμA or lower.

Furthermore, the cycle test was performed in the same manner as in Example 1. As a result, in the load test, in the 500 niobium solid electrolytic capacitors, the values of the 490 niobium solid electrolytic capacitors were 0.1 CVμA or lower, the values of the 8 niobium solid electrolytic capacitors were higher than 0.1 CVμA and 0.15 CVμA or lower, and the values of the 2 niobium solid electrolytic capacitors were higher than 0.15 CVμA and 0.2 CVμA or lower. In the moisture resistance test, the values of all the 20 niobium solid electrolytic capacitors were 0.1 CVμA or lower. The corrosion of the socket main units 2 was not observed.

Comparative Example 1

640 niobium solid electrolytic capacitors having a size of 3.5 mm×2.8 mm×1.8 mm, a rating of 2.5 V, and a capacity of 330 μF were produced in the same manner as in Example 4, except using, as the gang socket 1, a gang socket similar to the first row gang socket 88 in Example 1 (manufactured by Preci-dip corporation, "PCD receptacle 311 series round pin DIP socket", 2.54 mm pitch, 64 pin gang socket. The lead wire has a linear shape. In the gang socket, the insulator part is formed with resin and the metal of the socket main units is exposed to the insertion openings. The socket main units contain the same material as that of the socket main units used in Example 1).

The produced niobium solid electrolytic capacitors were subjected to a load test and a moisture resistance test in the same manner as in Example 1. As a result, in the load test, in the 500 niobium solid electrolytic capacitors, the values of the 491 niobium solid electrolytic capacitors were 0.1 CVμA or lower, the values of the 7 niobium solid electrolytic capacitors were higher than 0.1 CVμA and 0.15 CVμA or lower, and the values of the 2 niobium solid electrolytic capacitors were higher than 0.15 CVμA and 0.2 CVμA or lower. In the moisture resistance test, in the 20 niobium solid electrolytic capacitors, the values of the 19 niobium solid electrolytic capacitors were 0.1 CVμA or lower and the value of the one niobium solid electrolytic capacitor was higher than 0.1 CVμA and 0.15 CVμA or lower.

Furthermore, the cycle test was performed in the same manner as in Example 1. As a result, in the load test, in the 500 niobium solid electrolytic capacitors, the values of the 440 niobium solid electrolytic capacitors were 0.1 CVμA or lower, the values of the 54 niobium solid electrolytic capacitors were higher than 0.1 CVμA and 0.15 CVμA or lower, and the values of the 6 niobium solid electrolytic capacitors were higher than 0.15 CVμA and 0.2 CVμA or lower. In the moisture resistance test, in the 20 niobium solid electrolytic capacitors, the values of the 10 niobium solid electrolytic capacitors were 0.1 CVμA or lower, the values of the 6 niobium solid electrolytic capacitors were higher than 0.1 CVμA and 0.15 CVμA or lower, and the values of the 4 niobium solid electrolytic capacitor were higher than 0.15 CVμA and 0.2 CVμA or lower. Corrosion was observed in most socket main units 2. On and after the 22th test, a brown deposition was observed on the bottom of the conversion treatment container 50.

This application claims priority to Japanese Patent Application No. 2010-277100 filed on Dec. 13, 2010, and the disclosure constitutes a part of this application.

INDUSTRIAL APPLICABILITY

The gang socket according to the present invention is preferably used as a member for a capacitor element manufacturing jig but is not particularly limited to such application. Furthermore, the capacitor element manufacturing jig according to the present invention is preferably used as an electrolytic capacitor element manufacturing jig but is not particularly limited to such application. Furthermore, a capacitor obtained by the manufacturing method of the present invention can be utilized in, for example, electric devices, such as digital devices, such as a personal computer, a camera, a game machine, an AV device, and a cellular phone and various power supplies.

EXPLANATION OF NUMBERS

1: Gang socket
2: Socket main unit
3: Glass
   3a: Upper surface
4: Lead wire portion
5: Insulator part
   5a: Upper surface
   5b: Lower surface
6: Receiving unit
7: Small hole
9: Gap
10: Capacitor element manufacturing jig
11: Circuit board
14: Current limiting element (electrical connection terminal)
15: voltage limiting element (electrical connection terminal)
18: Resistor
19: Transistor
21: Pillar portion
22: Inclined surface portion
30: Electrical circuit
31: Diode
37: Lead wire insertion opening
51: Cathode plate
52: Anode body
54: Dielectric layer
55: Semiconductor layer
56: Capacitor element
59: Treatment liquid (chemical conversion treatment liquid, semiconductor layer forming liquid)

The invention claimed is:
1. A method for manufacturing a capacitor element comprising:

a dielectric layer formation process of connecting an anode body for capacitor to a gang socket of a capacitor element manufacturing jig including a circuit board on which an electrical circuit is formed, immersing the anode body in a chemical conversion treatment liquid, and then applying a current while using the anode body as an anode in the immersed state to form a dielectric layer on the surface of the anode body; and after the dielectric layer formation process, a heat treatment process including removing the gang socket to which the anode body is connected from the circuit board of the jig, and then heat treating the anode body connected to the gang socket.

2. A method for manufacturing a capacitor element, comprising:

a semiconductor layer formation process of connecting an anode body on a surface of which a dielectric layer is formed to a gang socket of the capacitor element manufacturing jig including a circuit board on which an electrical circuit is formed, immersing the anode body in a semiconductor layer forming liquid, and then applying a current while using the anode body as an anode in the immersed state to form a semiconductor layer on a surface of the dielectric layer on the surface of the anode body; and after the semiconductor layer formation process, a heat treatment process including removing the gang socket to which the anode body is connected from the circuit board of the jig, and then heat treating the anode body connected to the gang socket.

3. A method for manufacturing a capacitor element, comprising:

a dielectric layer formation process of connecting an anode body to a gang socket of the capacitor element manufacturing jig including a circuit board on which an electrical circuit is formed, immersing the anode body in a chemical conversion treatment liquid, and then applying a current while using the anode body as an anode in the immersed state to form a dielectric layer on a surface of the anode body;

a semiconductor layer formation process of immersing the anode body on the surface of which the dielectric layer is formed obtained through the dielectric layer formation process in a semiconductor layer forming liquid, and then applying a current while using the anode body as an anode in the immersed state to form a semiconductor layer on a surface of the dielectric layer on the surface of the anode body;

between the dielectric layer formation process and the semiconductor layer formation process and/or after the semiconductor layer formation process, a first heat treatment process including removing the gang socket to which the anode body is connected from the circuit board of the jig, and then heat treating the anode body connected to the gang socket; and after the semiconductor layer formation process, a second heat treatment process including removing the gang socket to which the anode body is connected from the circuit board of the jig, and then heat treating the anode body connected to the gang socket.

4. The method for manufacturing a capacitor element according to claim 1, wherein the heat treatment is performed at 200° C. to 500° C.

5. A method for manufacturing a capacitor, comprising:
electrically connecting an electrode terminal to each of an anode body and a semiconductor layer of the capacitor element obtained by the manufacturing method according to claim 1, and sealing while leaving a part of the electrode terminals.

6. A method for manufacturing a capacitor, comprising:
electrically connecting an electrode terminal to each of an anode body and a semiconductor layer of the capacitor element obtained by the manufacturing method according to claim 2, and sealing while leaving a part of the electrode terminals.

7. A method for manufacturing a capacitor, comprising:
electrically connecting an electrode terminal to each of an anode body and a semiconductor layer of the capacitor element obtained by the manufacturing method according to claim 3, and sealing while leaving a part of the electrode terminals.

8. The method for manufacturing a capacitor element according to claim 2, wherein the heat treatment is performed at 150° C. to 300° C.

9. The method for manufacturing a capacitor element according to claim 3, wherein heat treating the anode body in the first heat treatment process is performed at 200° C. to 500° C., and heat treating the anode body in the second heat treatment process is performed at 150° C. to 300° C.

10. The method for manufacturing a capacitor element according to claim 1, further comprising:
providing the gang socket with:
a plurality of conductive socket main units, each of the conductive socket main units including an insertion opening; and
a plurality of receiving units that accommodate at least part of each of the plurality of conductive socket main units including the insertion opening;
accommodating the plurality of conductive socket main units in an insulator part with the insertion opening located toward a bottom surface of each of the plurality of receiving units, forming a small hole connected to a lower surface of the gang socket from the bottom surface of each of the plurality of receiving units, and providing at least a lower surface of the insulator part with a material that is corrosion resistant;
accommodating and securing at least part of each of the plurality of conductive socket main units into the insulator part of each of the plurality of receiving units, and connecting the insertion openings and the small holes; and
electrically connecting the plurality of conductive socket main units to the electrical circuit, and limiting a current for each of the plurality of conductive socket main units with the electrical circuit.

11. The method for manufacturing a capacitor element according to claim 2, further comprising:
providing the gang socket with:
a plurality of conductive socket main units, each of the conductive socket main units including an insertion opening; and
a plurality of receiving units that accommodate at least part of each of the plurality of conductive socket main units including the insertion opening;
accommodating the plurality of conductive socket main units in an insulator part with the insertion opening located toward a bottom surface of each of the plurality of receiving units, forming a small hole connected to a lower surface of the gang socket from the bottom surface of each of the plurality of receiving units, and providing at least a lower surface of the insulator part with a material that is corrosion resistant;

accommodating and securing at least part of each of the plurality of conductive socket main units into the insulator part of each of the plurality of receiving units, and connecting the insertion openings and the small holes; and electrically connecting the plurality of conductive socket main units to the electrical circuit, and limiting a current for each of the plurality of conductive socket main units with the electrical circuit.

12. The method for manufacturing a capacitor element according to claim 3, further comprising:

providing the gang socket with:
- a plurality of conductive socket main units, each of the conductive socket main units including an insertion opening; and
- a plurality of receiving units that accommodate at least part of each of the plurality of conductive socket main units including the insertion opening;

accommodating the plurality of conductive socket main units in an insulator part with the insertion opening located toward a bottom surface of each of the plurality of receiving units, forming a small hole connected to a lower surface of the gang socket from the bottom surface of each of the plurality of receiving units, and providing at least a lower surface of the insulator part with a material that is corrosion resistant;

accommodating and securing at least part of each of the plurality of conductive socket main units into the insulator part of each of the plurality of receiving units, and connecting the insertion openings and the small holes; and electrically connecting the plurality of conductive socket main units to the electrical circuit, and limiting a current for each of the plurality of conductive socket main units with the electrical circuit.

* * * * *